(12) United States Patent
Kwan et al.

(10) Patent No.: US 11,622,258 B2
(45) Date of Patent: *Apr. 4, 2023

(54) METHOD AND SYSTEM FOR PROVIDING COMMUNICATION SERVICES USING A PLURALITY OF REMOTE SUBSCRIBER IDENTITY MODULES

(71) Applicant: Pismo Labs Technology Limited, Kowloon (HK)

(72) Inventors: Man Kit Kwan, New Territories (HK); Uzair Ahmed Chughtai, New Territories (HK); Ka Ho Ho, Kowloon (HK)

(73) Assignee: Pismo Labs Technology Limited, Kowloon (HK)

( * ) Notice: Subject to any disclaimer, the term of this patent is extended or adjusted under 35 U.S.C. 154(b) by 294 days.

This patent is subject to a terminal disclaimer.

(21) Appl. No.: 17/029,014

(22) Filed: Sep. 22, 2020

(65) Prior Publication Data
US 2021/0360382 A1   Nov. 18, 2021

Related U.S. Application Data

(63) Continuation-in-part of application No. 17/040,527, filed as application No. PCT/IB2020/054671 on May 18, 2020, now Pat. No. 11,490,437.

(51) Int. Cl.
*H04W 8/18* (2009.01)
*H04W 8/20* (2009.01)
(Continued)

(52) U.S. Cl.
CPC .......... *H04W 8/183* (2013.01); *H04W 8/205* (2013.01); *H04W 12/06* (2013.01); *H04W 12/35* (2021.01); *H04W 12/42* (2021.01)

(58) Field of Classification Search
CPC ..... H04W 8/183; H04W 8/205; H04W 12/06; H04W 12/35; H04W 12/42
See application file for complete search history.

(56) References Cited

U.S. PATENT DOCUMENTS

| 10,708,761 B1 * | 7/2020 | Yin ...................... H04W 8/205 |
| 2009/0170495 A1 | 7/2009 | Blum |

(Continued)

FOREIGN PATENT DOCUMENTS

| CN | 105491547 A | 4/2016 |
| WO | 2014122588 A1 | 8/2014 |

OTHER PUBLICATIONS

Office Action dated Apr. 12, 2021 in related U.S. Appl. No. 17/029,018, filed Sep. 22, 2020.

(Continued)

*Primary Examiner* — Brandon J Miller
(74) *Attorney, Agent, or Firm* — Hershkovitz & Associates, PLLC; Abe Hershkovitz

(57) ABSTRACT

A method and a wireless communication device for providing communication service to devices connected to the wireless communication device. By establishing a starter wireless carrier connection using a starter SIM from a plurality of local SIMs, the wireless communication device establishes one or more logical data connections with one or more SIM banks. Remote-SIMs are selected from the one or more SIM banks and used to establish further wireless carrier connections to allow communication service to be provided to the devices over wireless carrier connections.

20 Claims, 17 Drawing Sheets

(51) Int. Cl.
  *H04W 12/06* (2021.01)
  *H04W 12/30* (2021.01)
  *H04W 12/42* (2021.01)

(56) References Cited

U.S. PATENT DOCUMENTS

| | | |
|---|---|---|
| 2013/0109436 A1 | 5/2013 | Tat |
| 2015/0081884 A1 | 3/2015 | Maguire |
| 2015/0296378 A1* | 10/2015 | Plestid .................... H04W 8/12 455/411 |
| 2015/0373530 A1 | 12/2015 | Stein |
| 2017/0170856 A1 | 6/2017 | Shen |
| 2017/0223313 A1* | 8/2017 | Chong .................. H04W 76/10 |
| 2017/0251020 A1 | 8/2017 | Plestid et al. |
| 2017/0289788 A1 | 10/2017 | Lalwaney |
| 2018/0007539 A1 | 1/2018 | Stein |
| 2018/0234834 A1 | 8/2018 | Stein |
| 2019/0036562 A1 | 1/2019 | Thakkar |
| 2019/0373444 A1 | 12/2019 | Chughtai et al. |
| 2019/0373447 A1 | 12/2019 | Chughtai et al. |
| 2020/0396593 A1* | 12/2020 | Vikberg ................ H04W 12/08 |

OTHER PUBLICATIONS

Office Action dated May 4, 2021 in related U.S. Appl. No. 17/029,022, filed Sep. 22, 2020.
Office Action dated Jun. 11, 2021 in related U.S. Appl. No. 17/029,018, filed Sep. 22, 2020.
Office Action dated Jul. 28, 2021 in related U.S. Appl. No. 17/029,022, filed Sep. 22, 2020.
Office Action dated Oct. 22, 2021 in related U.S. Appl. No. 17/029,024, filed Sep. 22, 2020.
Office Action dated Nov. 3, 2021 in related U.S. Appl. No. 17/040,527, filed Sep. 22, 2020.
International Search Report in International Application No. PCT/IB2020/054671, dated Feb. 20, 2021.
Written Opinion of the International Search Authority in International Application No. PCT/IB2020/054671, dated Feb. 20, 2021.
English Language Abstract of CN 105491547 A (Apr. 13, 2016).

* cited by examiner

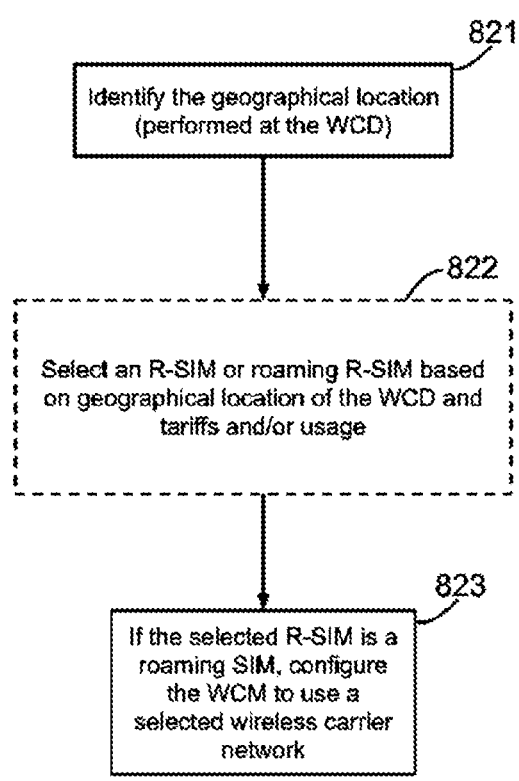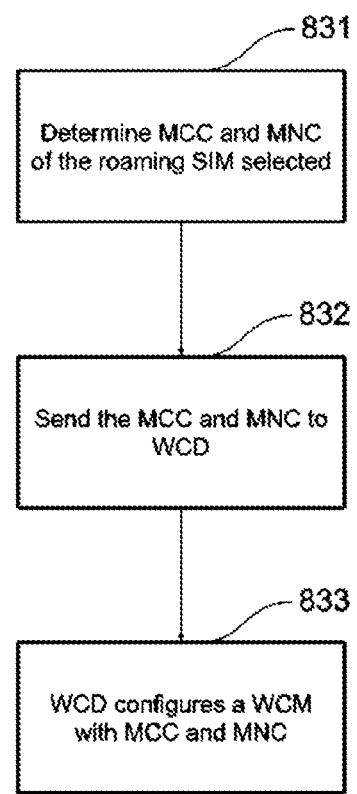
Fig. 8C
Fig. 8D

METHOD AND SYSTEM FOR PROVIDING COMMUNICATION SERVICES USING A PLURALITY OF REMOTE SUBSCRIBER IDENTITY MODULES

CROSS-REFERENCE TO RELATED APPLICATIONS

This patent application is a non-provisional continuation in-part application, which claims the benefits of and is based on U.S. application Ser. No. 17/040,527 filed on Sep. 22, 2020, which is a 371 National Stage entry of Patent Cooperation Treaty Application No. PCT/IB2020/054671, filed on May 18, 2020, and is related to U.S. application Ser. No. 17/029,018, U.S. application Ser. No. 17/029,022, and U.S. application Ser. No. 17/029,024 all filed on Sep. 22, 2020, the disclosures of which are hereby incorporated by specific reference thereto.

TECHNICAL FIELD

The present invention generally relates to wireless communication devices that use remote SIM to establish wireless carrier connections, and more particularly to select a plurality of remote SIMs and establish the wireless carrier connections through a plurality of wireless communication modules.

BACKGROUND ART

A wireless communication device, such as a cellular router, provides communication services to other devices. The wireless communication device may establish a wireless carrier connection and then allow the other devices to send and receive data over the wireless carrier connection. In order to establish wireless carrier connections, one or more subscriber identity module (SIM) cards are used.

When the wireless communication device moves to another location, a different SIM card may be required. Further, when the data quota of a SIM card is used up or about to be used up, another different SIM card may be swapped with the SIM card. Also, when a SIM card is out-of-order, a new SIM will be required to replace the SIM card. There is a myriad of reasons why a SIM card may need to be replaced at the wireless communication device.

One of the solutions is to use remote SIM. The remote SIM is placed at SIM bank. The wireless communication device communicates with the SIM bank over a logic data connection in order to use the remote SIM; and the logical data connection is established over the already established wireless carrier connection.

In case there is disruption, at the logical data connection or/and at the wireless carrier connection, communications with the SIM bank may be affected adversely. Then a remote SIM that has been being used may become unavailable. In such circumstances, the wireless communication device will not be able to provide communication services to other devices.

SUMMARY OF INVENTION

The present invention discloses a method to select subscriber identity module (SIM) card at a wireless communication device. The selection comprises: establish a starter wireless carrier connection using a starter local SIM. Then, a starter authentication connection is established between the wireless communication device and a SIM bank. When the starter authentication connection is established, select a first local SIM or a first remote SIM from the SIM bank to establish a first wireless carrier connection. After that, disconnect the starter wireless carrier connection. A second local SIM or a second remote SIM is selected from the SIM bank to establish a second wireless carrier connection. Finally, communication service is provided to devices connected to the wireless communication device over one of or both of the first wireless carrier connection and second wireless carrier connection.

BRIEF DESCRIPTION OF DRAWINGS

FIG. 8C is a process flowchart illustrating a method according to one example embodiment of the present invention.

FIG. 8D is a process flowchart for one of the embodiments according to the present invention.

DESCRIPTION OF EMBODIMENTS

Figure 1A:
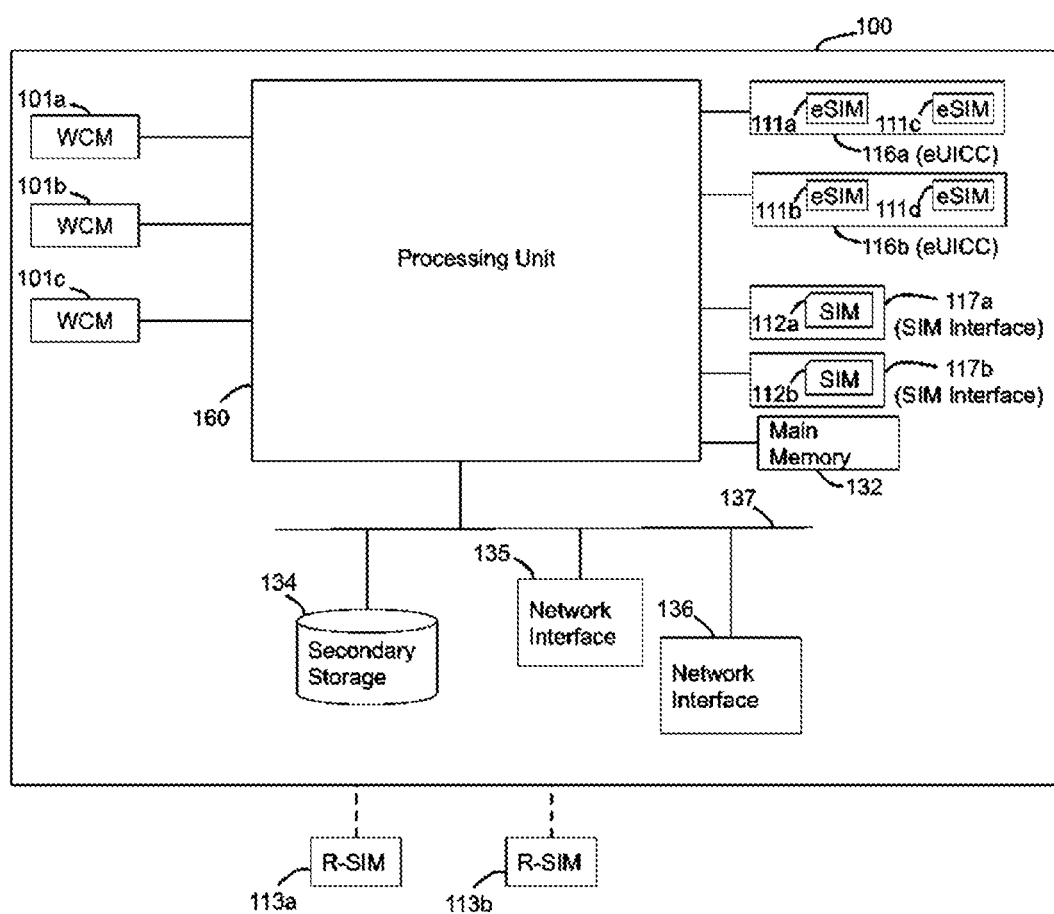
FIG. 1A illustrates a schematic block diagram of wireless communication device according to one of the embodiments of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine-readable mediums for storing information.

The term "machine-readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine-readable medium including a virtual machine-readable medium in a cloud-based instance. Furthermore, embodiments may be implemented by hardware, software, firmware, middleware, microcode, hardware description, languages, or any combination thereof. When implemented in software, firmware, middleware or microcode, the program code or code segments to perform the necessary tasks may be stored in a machine-readable medium such as storage medium.

The term computer-readable medium, main memory, secondary storage, or other storage medium as used herein refers to any medium that participates in providing instructions to a processing unit for execution. The processing unit reads the data written in the primary storage medium and writes the data in the secondary storage medium. Therefore, even if the data written in the primary storage medium is lost due to a momentary power failure and the like, the data can be restored by transferring the data held in the secondary storage medium to the primary storage medium. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile storage includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software codes to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

Alternatively, hardware circuitry may be used in place of, or in combination with, software instructions to implement processes consistent with the principles of the invention. Thus, implementations consistent with principles of the invention are not limited to any specific combination of hardware circuitry and software.

A network interface may be implemented by a standalone electronic component or may be integrated with other electronic components. A network interface may have no network connection or at least one network connection depending on the configuration. A network interface, such as network interfaces 135 and 136 in WCD 100 may be an Ethernet interface, a frame relay interface, a fiber optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infrared, High-Speed Packet Access (HSPA), HSPA+, Long Term Evolution (LTE), WiMAX, General packet radio service (GPRS), Global System for Mobile Communications (GSM), Enhanced Data rates for GSM Evolution (EDGE), Code division multiple access (CDMA), Wi-Fi, CDMA2000, Wideband CDMA (WCDMA), Time Division CDMA (TD-SCDMA), BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface.

As disclosed herein the term "wireless communication module" may represent a transceiver module to provide network capabilities to a power controller or power controller server using 3G, GPRS or GPS modules, through wires or through an Ethernet cable. The wireless communication module lows a processing unit to obtain user information and communications port of the wireless communication module can connect to a personal computer or other power controller or power controller server (PCS) through wires or wirelessly by using serial bus or Ethernet or using 2G/3G/4G or LTE technology. The wireless communication module can be used as a network interface for applications that require data to be shared between a power controller and an intelligent device such as a host computer and/or a server.

FIG. 1A is a schematic block diagram illustrating the hardware blocks of Wireless Communication Device (WCD) 100. WCD 100 comprises a plurality of SIM card interfaces 117 and a plurality of Embedded Universal Integrated Circuit Cards (eUICCs) 116. Each of the plurality of SIM card interfaces 117 is configurable to connect one or more removable SIMs. For illustration purposes, one removable SIM is described herein for each of the SIM card interfaces. For example, SIM card interface 117a is connected to removable SIM 112a and SIM card interface 117b is connected to removable SIM 112b. A removal SIM may be a Universal Integrated Circuit Card. Each of the SIM card interfaces may be connected to a SIM slot for placing the removable SIM.

eUICCs 116 may be built into the WCD and are not removable. Each of the eUICCs 116 is configurable to implement one or more electronic SIMs (eSIMs). For illustration purposes, one eSIM is described herein for each of the eUICCs. For example, eUICC 116a is used to implement eSIM 111a and eSIM 111c; and eUICC 116b is used to implement eSIM 111b and eSIM 111d. An eSIM may represent a SIM profile. The SIM profile may be derived from a remote eSIM subscription management server based on the information provided by a wireless carrier network. A SIM profile contains information which provides access to a specific wireless carrier network for wireless communication. eSIMs 111a-d may be from the same or different wireless carrier networks. eSIMs 111 and removable SIMs 112, hereinafter, are also referred to as local SIMs (L-SIMs). A local SIM (L-SIM) is a SIM that is placed in WCD 100. There is no limitation on the number of SIMs that may be placed in WCD 100.

WCD 100 is also configurable to connect one or more remote SIMs (R-SIMs) through the Internet. A remote SIM (R-SIM) is a SIM that is placed in a SIM bank. For illustration purposes, R-SIMs 113a and 113b are shown. R-SIMs 113a and 113b may be placed in one or more SIM banks configurable to connect with WCD 100 through one or more data connections. There is no limitation on the number of SIMs that may be placed in a SIM bank. There is no limitation on the number of SIM banks that may be connected to WCD 100. For example, R-SIMs 113a and 113b may be placed in two different SIM banks.

WCD 100 further comprises a plurality of wireless communication modules (WCMs), such as WCMs 101a-101c. Each of the plurality of WCMs 101 is configurable to connect any one of the L-SIMs or R-SIMs at a time. The Wireless communication modules, such as WCMs 101, may be connected to embedded/external antennas and perform wireless communication via the antennas. An example of WCM is Sierra Wireless EM7511.

A processing unit, such as processing unit 160, executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer-readable storage medium.

Processing unit 160 may be a complex programmable logic device (CPLD), a field-programmable gate array (FPGA), a central processing unit (CPU), a microprocessor, a microcontroller, a digital signal processor (DSP), any combination of those devices, or any other circuitry configurable to execute the program instructions for implementing the embodiments disclosed herein. In one exemplary embodiment, processing unit 160 has an adequate number of input/output pins and processing power. Therefore, processing unit 160 may be directly connected to SIM card interfaces 117, eUICCs 116, WCMs 101 and other hardware components, such as, main memory 132 and system bus 137.

Figure 1B:
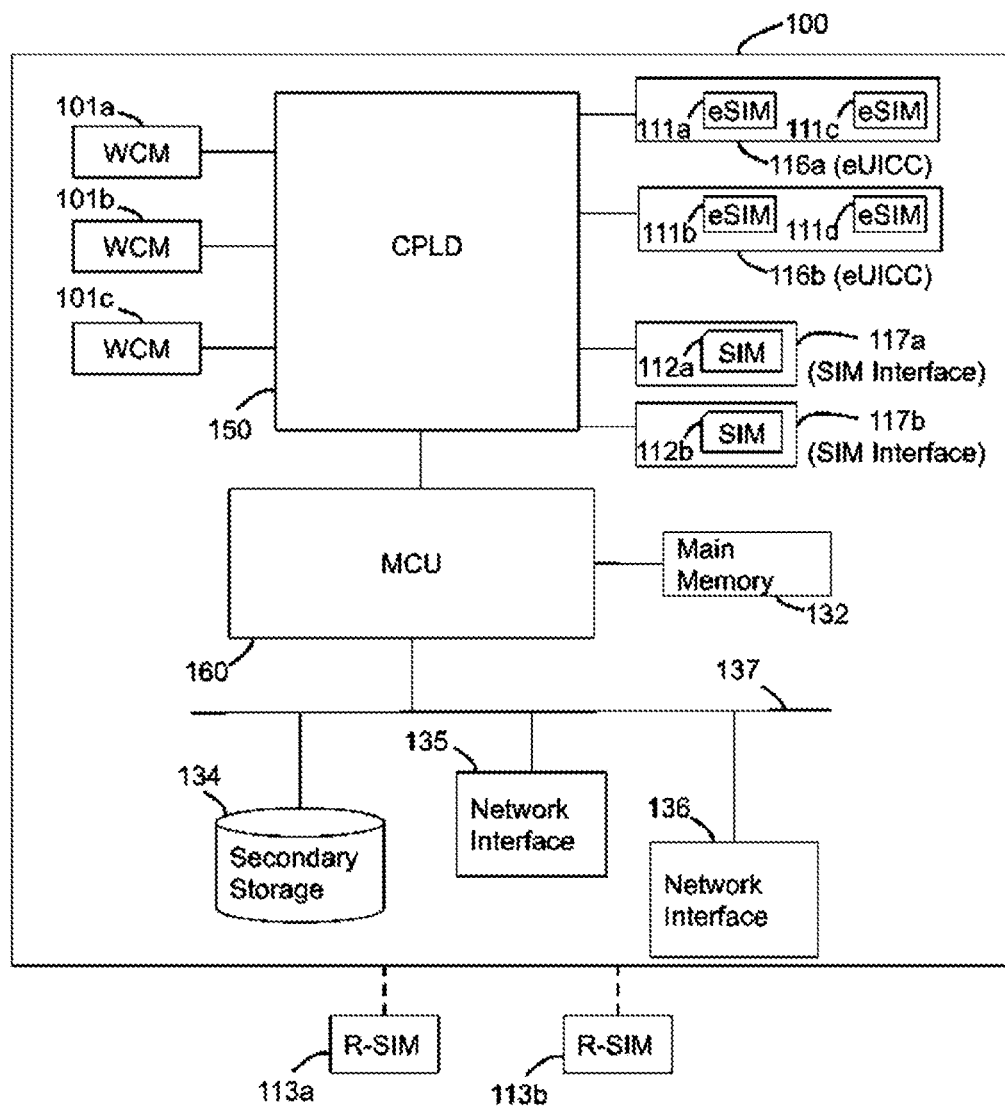
FIG. 1B illustrates a schematic block diagram of wireless communication device according to one of the embodiments of the present invention.
Figure 1C:
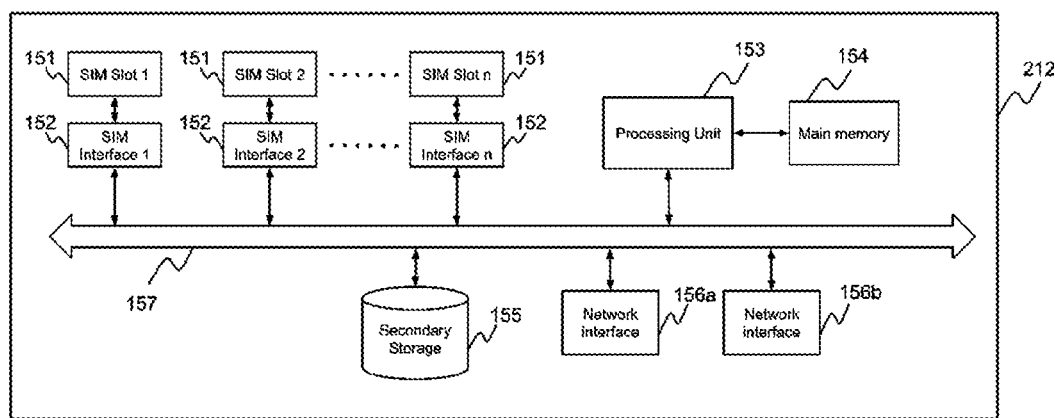
FIG. 1C illustrates a schematic block diagram of SIM bank according to the present invention.

In another exemplary embodiment, as shown in FIG. 1B, processing unit 160 does not have an adequate number of input/output pins to connect to all hardware components. Therefore, a complex programmable logic device (CPLD), for example, CPLD 150 is connected to processing unit 160 in order to provide an adequate number of input/output pins. Some of the hardware components such as eUICCs 116, SIM card interfaces 117 and WCMs 101 may be connected to the processing unit through the CPLD while the other hardware components, such as main memory 132 and system bus 137 may be connected to the processing unit directly, through another circuit, and/or through another CPLD. There are no limitations that a CPLD must be used. Any logic circuit configurable to realize multiplexing may be used. For example, an FPGA or a multiplexer may also be used.

Network interfaces 135 and 136 may be connected to processing unit 160 through system bus 137. System bus 137 can be any of several types of bus structures including a memory bus, a peripheral bus, and a local bus using any of a variety of bus architectures.

In one variant, WCM 101*a-c*, eUICC 116*a-b*, SIM interfaces 117*a-b* and main memory 132 are not connected to processing unit 160 directly. Instead they are connected to processing unit 160 indirectly through a bus, such as system bus 137. In one variant, they are connected to processing unit 160 indirectly through multiple buses.

Figure 2A:
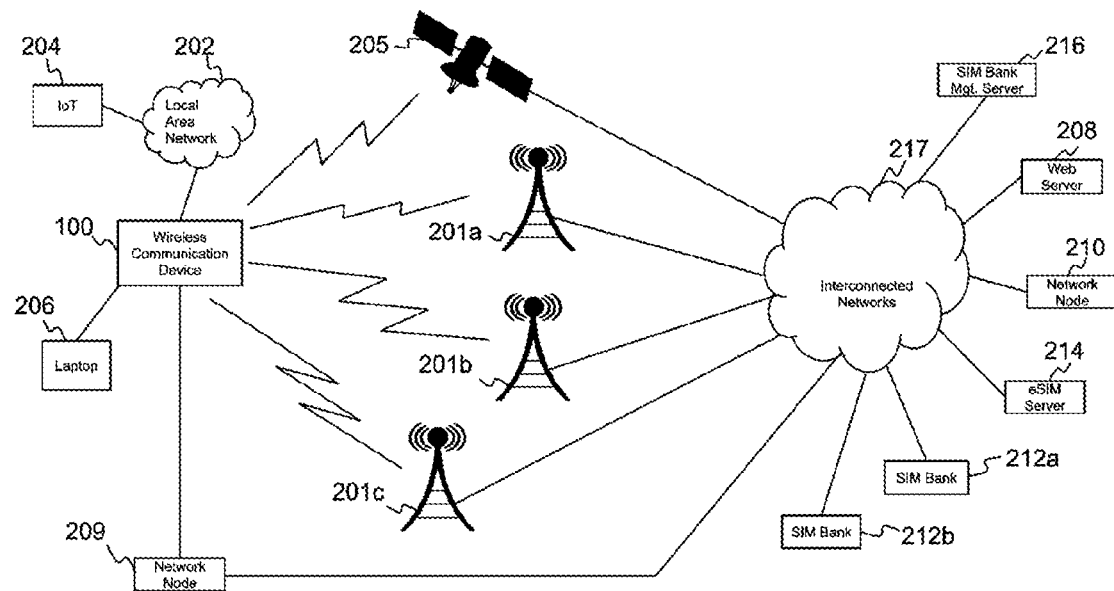
FIG. 2A illustrates a network diagram according to the present invention.

FIG. 2A is a schematic block diagram illustrating an exemplary network environment operable to utilize a plurality of SIMs for data communication in accordance with the embodiments disclosed herein. FIG. 2A includes three wireless carrier networks, for example, wireless carrier networks 201*a*-201*c*. Each wireless carrier network may provide communication coverage for a corresponding particular geographic area using cellular technologies. Wireless carrier networks 201*a*-201*c* may be operated by the same company or different companies.

WCD 100 may communicate with web server 208, network node 210, SIM banks 212, SIM bank management server 216 and eSIM subscription management server 214 through interconnected networks 217. For readability, the eSIM subscription management server is hereinafter referred to as eSIM server. WCD 100 may connect with interconnected network 217 through one or more wireless carrier connection(s) established through wireless carrier networks 201*a*-201*c*. WCD 100 may establish the wireless carrier connection(s) by using any SIMs including L-SIMs and R-SIMs discussed under FIG. 1A.

Optionally, FIG. 2A also includes a satellite carrier network, for example, satellite carrier network 205. Satellite carrier network 205 may be realized using a geostationary satellite or a low earth orbit (LEO) satellite which provides communication coverage for a larger geographic area compared to a wireless carrier network. For example, WCD 100 may be under respective coverage of satellite carrier network 205 and may connect with interconnected network 217 optionally through one or more satellite data connections established through satellite carrier network 205.

Optionally, WCD 100 is also capable of being connected with one or more wired communication networks. An example wired communication network may include network nodes 209. WCD 100 may connect to interconnected network 217 optionally through one or more wired data connections established using one or more network nodes including, but not limited to, 209.

WCD 100 may be connected with one or more local hosts directly or through a connected local area network (LAN). For illustration purposes, WCD 100 is connected to local host Laptop 206 directly and to local host IoT 204 through LAN 202. Each of the local hosts 204 and 206 may connect to interconnected network 217 through WCD 100. Thus, WCD 100 acts as a gateway to allow data packets to be routed through one or more wireless carrier connection(s) established through wireless carrier networks 201*a*-201*c*.

According to one embodiment of the present invention, when a first group of data packets is received at WCD 100 from a local host which is destined for a remote host reachable through any of the wireless carrier connections established, WCD 100 first decides which wireless carrier connections should be used for sending the data packets. For illustration purposes, WCD 100 receives data packets from laptop 206 which are destined for website server 208. The decision for selecting the wireless carrier connection(s) to send the data packets may be based on a policy. The policy may be based on one or more of the following criteria: network performance, network security, user access, user preference, device preference, signal strength, billing cycle, time.

Figure 10:
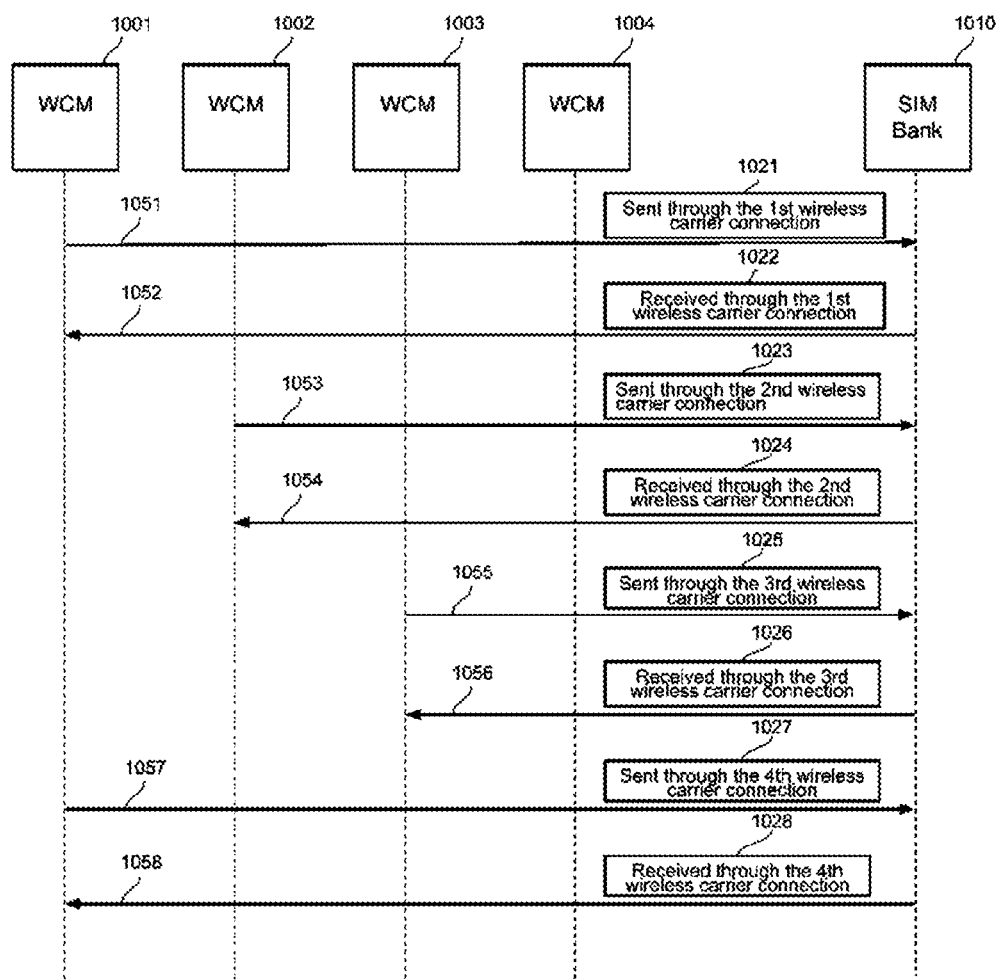
FIG. 10 is a timing diagram of an exemplary embodiment of the present invention.

FIG. 10 is a schematic block diagram of an exemplary SIM bank according to one embodiment of the present invention. For example, the exemplary SIM bank is SIM bank 212*a*. SIM bank 212*a* comprises at least one processing unit 153 and at least one main memory 154. Processing unit 153 may be connected with main memory 154 directly and with other hardware components, for example, with at least one secondary storage 155, one or more network interfaces 156 and a plurality of SIM interfaces 152, through a system bus, such as system bus 157. System bus 157 may be any of several types of bus structures including a memory bus, a peripheral bus or a local bus using any of a variety of bus architecture.

Each of the plurality of SIM interfaces 152 may be connected with a corresponding SIM slot, such as SIM slots 151 to place or to connect to a SIM. A SIM interface, such as SIM interfaces 152, is used to access and write information to and from a SIM. There are many SIM interfaces available from different manufacturers. Some of the SIM interfaces provide functions of power supply, card reset signal, card clock signal and data exchange. A data exchange may be performed between the SIM and the processing unit of SIM bank 212*a* through the SIM interfaces. Some of the SIM interfaces may only be connected with one SIM, while some may be connected with a plurality of SIMs.

In one variant, hardware components such as secondary storage 155, network interfaces 156, and SIM interfaces 152 may be directly connected with processing unit 153 when the processing unit has an adequate number of I/O pins. System bus 157 may be omitted. Alternatively, when processing unit 153 does not have an adequate number of I/O pins, some or all of the hardware components may be connected to the processing unit using one or more CPLDs. There is no limitation that CPLDs must be used. Multiplexers, FPGAs or any logic circuits which serve the purpose of providing the required number of I/O pins may also be used.

The one or more SIM banks may be managed by one or more SIM bank management servers. For example, one SIM bank management server 216 is shown in FIG. 2A. SIM bank management server 216 may be remotely or locally coupled to the SIM banks. Connection of WCD 100 to SIM bank 212*a* may be managed through a SIM bank management server, for example, SIM bank management server 216 shown in FIG. 2A. There is no limitation that a SIM bank and a SIM bank management server must be separated. A device may comprise a SIM bank and a SIM bank management server together.

The SIM bank management server may perform a device authentication procedure before providing access to WCD 100 to any of the SIM banks. For availing the device authentication information, WCD 100 may need to be registered with the SIM bank management server. The registration may be performed online, such as through a user interface (e.g. web page or web form) or offline. The authentication information to authenticate WCD 100 may be duly provided by WCD 100 or by an administrator of WCD 100 to SIM bank management server 216. SIM bank management server 216 may store necessary information including, but not limited to, WCD information, administrator information, registration information, authentication information, number of SIM banks connected, SIM banks' location and information of SIMs placed in the SIM banks.

WCD 100 may communicate with SIM bank management server 216 for accessing information of SIM banks 212. At first, WCD 100 may not have access information of a SIM bank, after communicating with the SIM bank management server 216, WCD 100 may receive access information, such as IP address and hostname of a SIM bank and/or a security code. After receiving the access information, WCD 100 may become able to access the corresponding SIM bank.

Figure 1D:
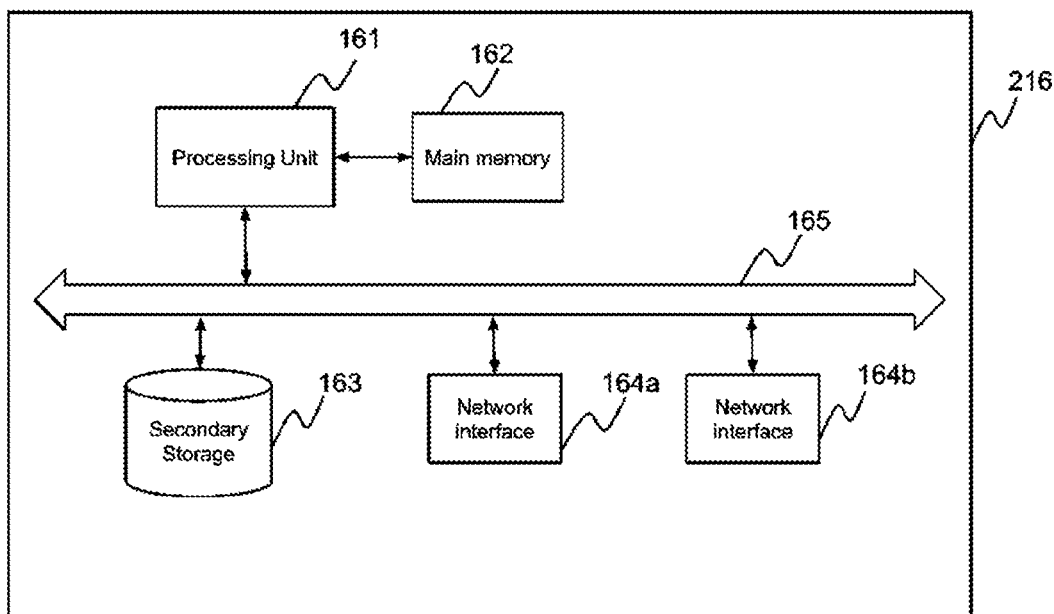
FIG. 1D illustrates a schematic block diagram of SIM bank management server according to the present invention.

FIG. 1D is a schematic block diagram of an exemplary SIM bank management server 216 shown in FIG. 2A. SIM bank management server 216 comprises at least one processing unit 161 and at least one main memory 162. Processing unit 161 may be connected with main memory 162 directly and with other components, for example, with at least one secondary storage 163 and one or more network interfaces 164a and 164b, through a system bus 165. System bus 165 may be any of several types of bus structures including a memory bus, a peripheral bus or a local bus using any of a variety of bus architecture.

Figure 2B:
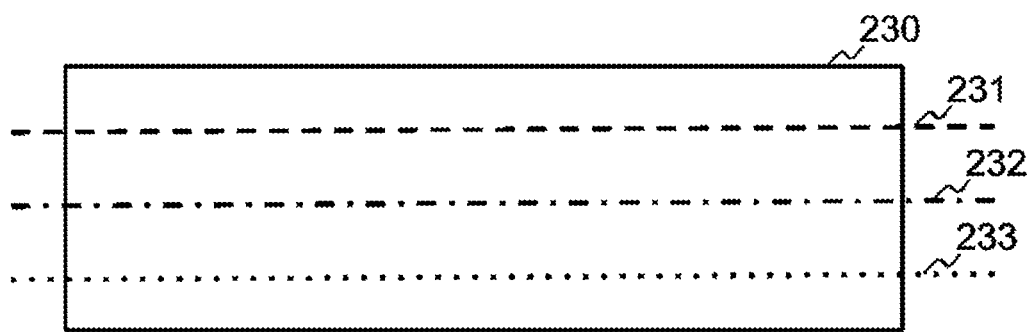
FIG. 2B illustrates a wireless carrier connection according to the present invention.

FIG. 2B illustrates how a wireless carrier connection carries different logical data connections. Wireless carrier connection 230 may be one of the wireless carrier connections established by WCD 100 over any of wireless carrier networks 201a-201c. Wireless carrier connection 230 may be established using 2G/3G/4G/5G, LTE, Wi-Fi, or any other wireless communication technologies. Logical data connections 231-233 may be established using TCP/IP, UDP/IP, IP or any logical data connection protocol. For example, logical data connection 231 may be established between WCD 100 and network node 210; logical data connection 232 may be established between WCD 100 and SIM bank 212a; and logical data connection 233 may be established between WCD 100 and SIM bank 212b. There is no limitation that all logical data connections 231-233 must be established using the same or different logical data connection protocols. There is no limit on the number of logical data connections that may comprise in a wireless carrier connection. A logical data connection may also be a tunnel to encapsulate another logical data connection. A plurality of logical data connections may also be aggregated together to form an aggregated logical data connection.

As WCD 100 may have established a plurality of wireless carrier connections concurrently, WCD 100 may establish a logical data connection with a device reachable through interconnected networks 217 through any of the plurality of wireless carrier connections. WCD 100 may also establish a plurality of logical data connections with a device reachable through interconnected networks 217 through the plurality of wireless carrier connections concurrently.

Figures 3A, 3B:
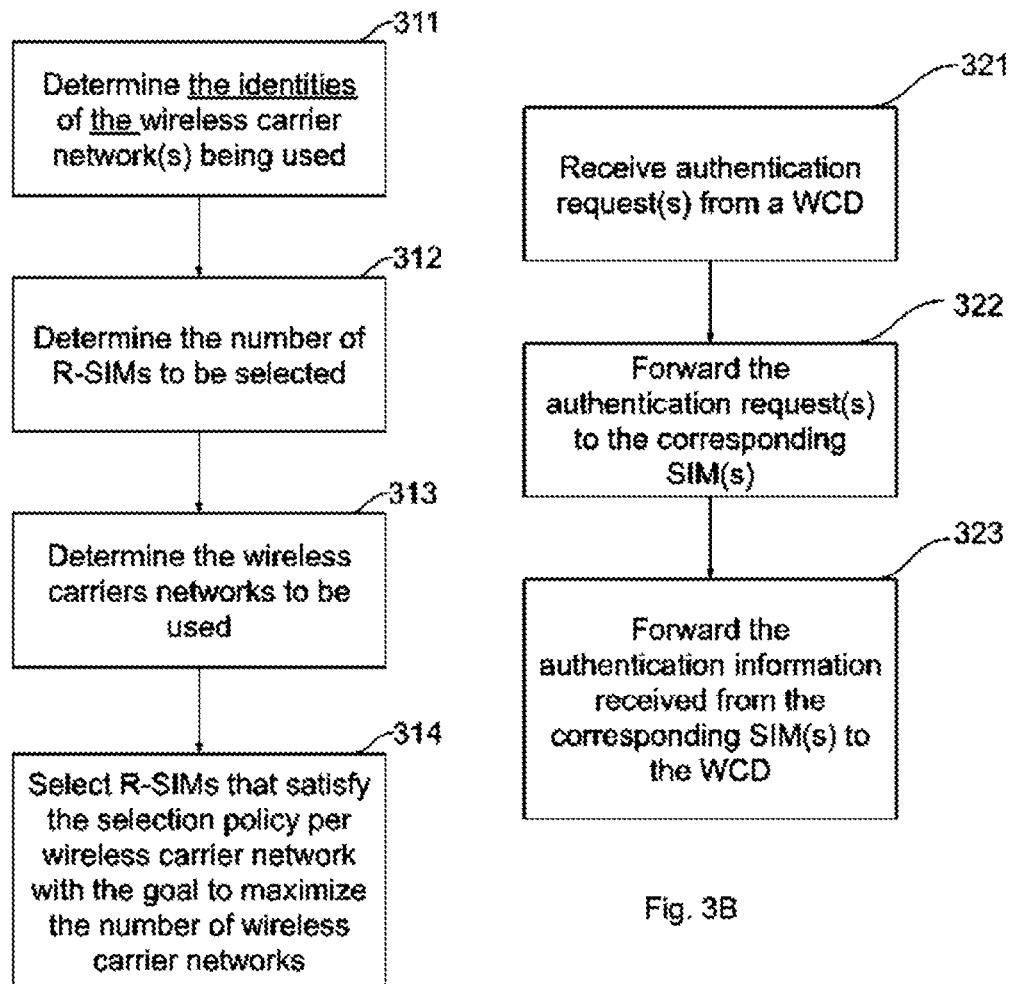
FIG. 3A is a process flowchart illustrating a method for selecting R-SIM according to the present invention.
FIG. 3B is a process flowchart illustrating a method for providing authentication information according to the present invention.

FIG. 3A is a process flowchart illustrating a method performed at WCD 100, SIM bank 212 and/or SIM bank management server 216 to select R-SIM. In process 311, the processing unit determines the identities of wireless carrier networks that are being used by WCD 100. WCD 100 may be using no, one or a plurality of wireless carrier networks. In process 312, the processing unit determines the number of R-SIMs to be selected, which should be equal to or fewer than the number of WCMs available. The selected R-SIMs will be used by the WCMs to establish wireless carrier connection(s).

In process 313, the processing unit determines the wireless carrier networks to be used, which will be based on the wireless carrier networks identified at the location of WCD 100. In process 314, the processing unit selects R-SIMs that satisfy a SIM selection policy per wireless carrier network with the goal to maximize the number of wireless carrier networks. When trying to maximize the number of wireless carrier networks, the processing unit may take into account the wireless carrier network(s) identified in process 311. The number of R-SIMs selected may be zero, one or more than one.

In an example scenario, WCD 100 in FIG. 2A has three WCMs, namely WCMs 101a-c in FIG. 1A. WCM 101a has already established a wireless carrier connection with wireless carrier network 201a using L-SIM 112a. Therefore, the wireless network carrier determined in process 311 is wireless carrier network 201a.

Therefore, there are still two available WCMs, namely WCM 101b and WCM 101c. In process 312, the number of R-SIMs to be selected will be two, i.e. two R-SIMs may then be selected for the WCM 101b and WCM 101c.

In process 313, the wireless networks determined to be used are wireless carrier network 201a-201c as these three networks are identified at the location of WCD 100.

In process 314, when selecting the two R-SIMs, the processing unit takes into account wireless carrier network A in order to maximize the number of different wireless carrier networks. The selected R-SIMs should also satisfy the SIM selection policy. If a selected R-SIM is a roaming R-SIM, the wireless carrier networks available to use the roaming R-SIM will also be considered to maximize the number of different wireless carrier networks. For example, there are a plurality of R-SIMs that satisfy the SIM selection policy, R-SIMs that are capable to be used for establishing wireless carrier connections with wireless carrier network 201a, wireless carrier network 201b and wireless carrier network 201c may be selected. However, in order to maximize the number of wireless carrier networks, only one R-SIM that is capable of establishing wireless carrier connections over wireless carrier network 201b and one R-SIM that is capable of being used for establishing wireless carrier connections over wireless carrier network 201c are selected.

Further, International Mobile Subscriber Identity (IMSI) and International Mobile Equipment Identity (IMEI) of the selected R-SIMs may then be forwarded by the SIM bank 212 or SIM bank management server 216 to WCD 100 in process 314.

There is no limitation that the number of R-SIMs selected must be two. The number of R-SIMs selected may be different depends on the number of WCMs available, When the number of wireless carrier networks at the location of WCD 100 is smaller than the number of R-SIMs to be selected, at least two R-SIMs may belong to one same wireless carrier network. If a selected R-SIM is a roaming R-SIM, the roaming R-SIM may be configured to use the same wireless carrier network with another R-SIM.

Processes 311 to 314 may be performed by the processing unit of WCD 100, the processing unit of SIM bank 212 or the processing unit of WCD 100 individually or together.

For example, process 311 may be performed by processing unit 160 of WCD 100 to determine the wireless carrier networks using one of WCMs 101. Process 311 may also be performed by the processing unit of SIM bank 212 or the processing unit of WCD 100. The processing unit of SIM bank 212 or the processing unit of WCD 100 may search a database for wireless carrier networks based on location information provided by WCD 100.

In one variant, the processes shown in FIG. 3A also applies to L-SIM.

FIG. 3B is a process flowchart illustrating a method performed by SIM bank 212 and/or SIM bank management server 216 to provide authentication information to WCD 100. At process 321, SIM bank 212 and/or SIM bank management server 216 receives one or more authentication requests from WCD 100. An authentication request is originally sent by a wireless carrier network to a WCM in WCD 100 for an R-SIM selected. When the WCM 100 sends an IMSI or IMEI to a wireless carrier network, the wireless carrier network may send the authentication request, such as a random challenge (RAND), to the WCM.

At process 321, SIM bank 212 forwards the authentication request to the selected SIM, which is accessible by the SIM bank 212. In the case that the authentication request is sent to SIM management server 216, SIM management server 216 will forward the authentication request to a corresponding SIM bank, such as SIM 212, for processing.

At process 322, the selected SIM processes the authentication request and then creates the authentication information, such as signed response (SRES), in response to the authentication requests. SIM bank 212a then forwards the authentication information received from the selected SIM to WCD 100 in process 323.

In one variant, WCD 100 may send a plurality of authentication requests together. When SIM bank 212a and/or SIM bank management server 216 receives the authentication requests in process 321, it may process processes 322 and 323 in parallel or in sequence for each authentication request.

In one variant, when a plurality of authentication requests is sent to SIM bank management server 216, SIM bank management server 216 may forward the authentication requests to a plurality of SIM banks based on where the selected SIMs are located.

Figure 4A:
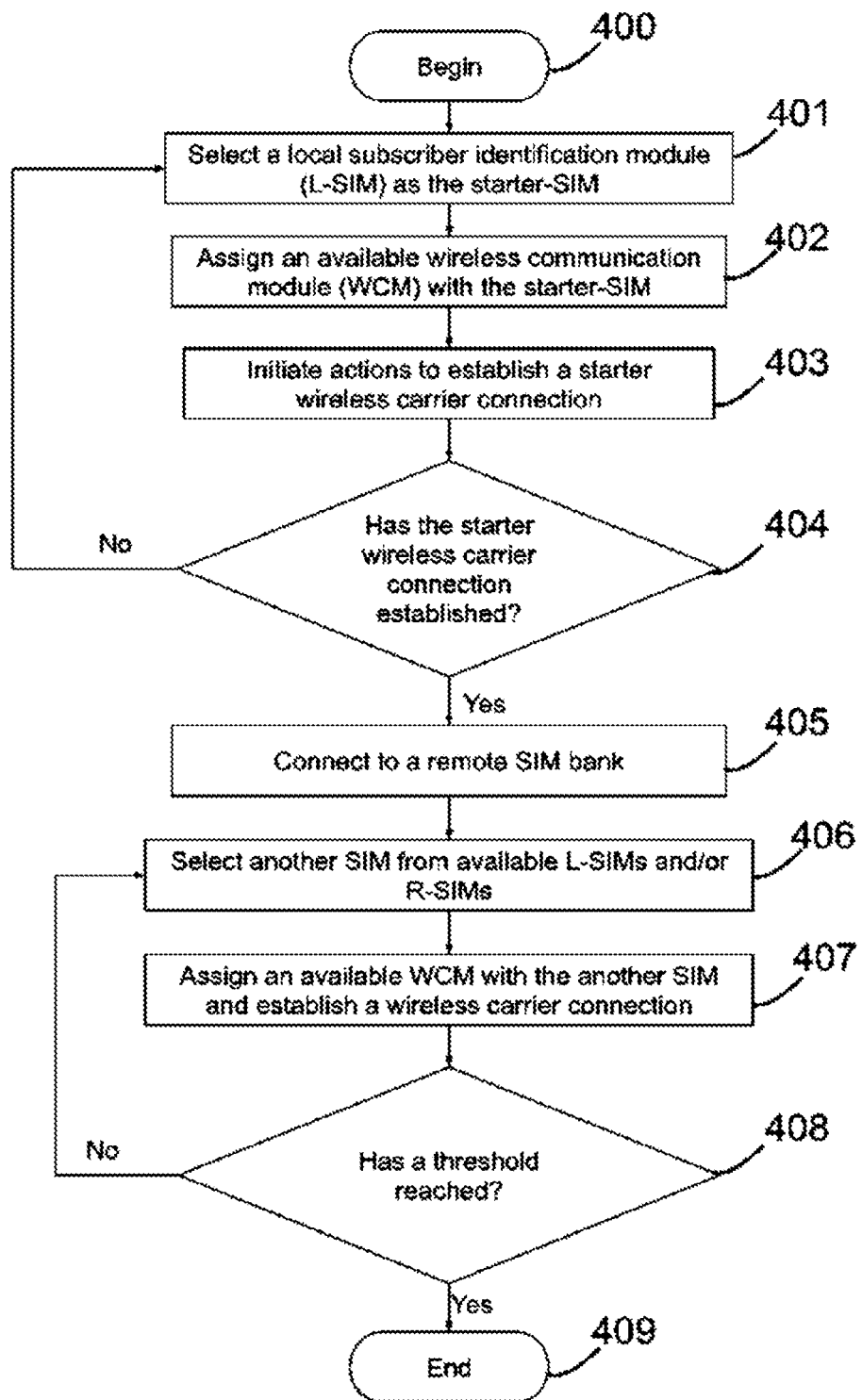
FIG. 4A is a process flowchart illustrating a method according to one embodiment of the present invention.

FIG. 4A is a process flowchart illustrating a method according to one embodiment of the present invention. The method may be performed at processing unit 160 of WCD 100. FIG. 4A should be viewed in conjunction with FIG. 1A and FIG. 2A. The method begins at process 400. At process 401, processing unit 160 selects an L-SIM from a plurality of available L-SIMs as a starter SIM to establish a starter wireless carrier connection with a starter wireless carrier network, for example, wireless carrier network 201c. The starter SIM is the first SIM in sequence being selected and used.

An available L-SIM is an L-SIM placed in WCD 100 and is not assigned with a WCM yet. A starter SIM refers to a SIM that is selected to establish a starter wireless carrier connection with a wireless carrier network. Once the connection is established, the wireless carrier network is referred to as the starter wireless carrier network and the connection is referred to as the starter wireless carrier connection. The selection of the L-SIM to be the starter SIM may be based on instructions manually provided by an administrator of the WCD or maybe based on a starter SIM selection policy. The starter SIM selection policy may be configured by the administrator of WCD 100 or retrieved from a remote server. The starter SIM selection policy may be based on one or more of the following criteria: geolocation of WCD 100, position of SIM placed in WCD 100, SIM category, network performance history of a SIM, identity of wireless carrier network issuing a SIM, services offered by wireless carrier network of a SIM, service quality of wireless carrier network of a SIM, administrator's preference, tariffs, remaining using usage quota of available L-SIMs, billing cycle information and time. In one variant, in the case that one or more L-SIMs are eSIM(s) from eUICC(s), wireless carrier networks configured in the eSIM(s), may be used for selection. When an eSIM, which is a SIM profile, is added, changed or deleted in the eUICC(s), the starter SIM selection policy will take into account of the modification.

When geolocation of WCD is used for starter SIM selection policy, longitude and latitude information based on GPS information obtained from a GPS receiver at WCD 100 may be used to look-up for available wireless carrier networks at the geographical location of WCD 100.

When a SIM is selected based on the position of SIM placed in WCD 100, a SIM that is positioned first will be selected first. For example, SIMs placed in WCD 100 may be positioned in a numerical or alphabetical order.

For example, when a SIM is selected based on the tariff price, a SIM with the lowest tariff may be selected. It is possible that wireless carrier networks may change tariffs. A SIM with the lowest tariff may no longer be the SIM with the lowest tariff. Therefore, the processing unit of WCD 100, may monitor the tariff price information from time to time and whenever a change in tariff is detected, the processing unit redetermines on which SIM having the lowest tariff price.

A SIM may also be selected based on billing cycle information. A billing cycle is the period of a cellular subscription for communication service. A billing cycle may be weekly, monthly or yearly. In one example scenario, where using billing cycle information may be beneficial is, data usage limit per billing cycle may be capped and exceeding the allowed data usage limit may incur high premiums. Therefore, when a SIM is selected based on billing cycle information, the SIM for which data usage limit of a billing cycle is about to reach, may not be selected.

A SIM may also be selected based on the time of a day. There are many reasons for selecting a SIM based on time, one example may be for the changes in tariff pricing. Some wireless carrier networks may offer different tariff prices for different times of the day. It is very common that wireless carrier networks offer lower tariff rates during off-peak periods. Therefore, a SIM from the wireless carrier network which offers the lowest tariff price for a specific time of the day may be selected when the selection occurs during that specified time period.

A SIM may be selected based on administrator's preference. An administrator of WCD 100 or SIM banks 212 may assign priority level to each SIM. Thus, when selecting a SIM based on the administrator's preference, a SIM with higher priority assigned will be selected. An administrator may assign priority level to a SIM based on different bases including the conditions of R-SIM selection criteria disclosed herein.

A SIM may also be selected based on service quality of the wireless carrier network of a SIM. When selecting a SIM based service quality, a SIM from the wireless carrier network which provides better quality of service will be selected. The service quality of a wireless carrier network may be evaluated based on different criteria including, but not limited to, signal strength, network coverage, security and simplicity of configuration.

At process 402, the processing unit 160 assigns an available WCM from a plurality of WCMs 101 to use the starter SIM. An available WCM is a WCM which is not assigned to any SIM yet and is operable. For illustration purposes, the starter SIM is SIM 112a and the available WCM is WCM 101a. Processing unit 160 assigns WCM 101a to SIM 112a. At process 403, processing unit 160 initiates actions to establish a starter wireless carrier connection using WCM 101a and SIM 112a. An assigned WCM may become un-assigned when it fails to establish a wireless carrier connection or its established wireless carrier connection is disconnected.

At process 404, processing unit 160 determines whether the starter wireless carrier connection has been established or not. If the starter wireless carrier connection has not been established, processing unit 160 loops back to process 401 and selects another SIM as starter SIM from the plurality of L-SIMs and performs processes 401-404. Processes 401-404 are iterated until the starter wireless carrier connection is successfully established. If each of the plurality of L-SIMs is attempted and the starter wireless carrier connection is not established, no further attempt will be performed. Optionally, a message is sent to its administrator informing that establishing a starter wireless carrier connection has failed and the method is stopped. In one variant, the loop between processes 401 to 404 will not be performed after a preset number of iterations has reached or a specific period of time is reached. In another variant, the method is restarted after a predetermined time interval. The time interval may be set as a default time interval by the manufacturer or may be manually set by the administrator of the WCD. The message may be displayed on a user interface (UI) of the WCD.

When the starter wireless carrier connection is established, WCD 100 connects a remote SIM bank, for example, SIM bank 212a by establishing a logical data connection through the starter wireless carrier connection at process 405. The logical data connection may be established using TCP, UDP or other communication protocols. The logical data connection with SIM bank 212a may be used to carry authentication request and authentication information while establishing one or more subsequent wireless carrier connection(s), thus, the logical data connection hereinafter is referred to as starter authentication connection.

In process 406, another SIM is selected from available L-SIMs and R-SIMs. An available R-SIM is a SIM in a SIM bank that is not assigned with a WCM yet. The selection of the another SIM may be performed manually by an administrator of WCD 100 or maybe be based on a SIM selection policy, which is different from the starter SIM selection policy. The SIM selection policy is similar to the starter SIM selection policy. However, the SIM selection policy may also select R-SIM while the starter SIM selection policy does not select R-SIM. The SIM selection policy may have the same or different selection criteria.

At process 407, an available WCM is assigned with the SIM selected at process 406 and a wireless carrier connection is established using the SIM selected at process 406 and the assigned WCM. In the course of establishing the wireless carrier connection, if the SIM selected at process 406 is an R-SIM, authentication request and authentication information related to the R-SIM selected at process 406 are transmitted between WCD 100 and SIM bank 212a using the starter authentication connection. On the other hand, if the SIM selected at process 406 is an L-SIM, the starter authentication connection may not be used as authentication request and authentication information with L-SIM does not go through the authentication connection. The starter authentication connection may be continued to be used onwards for transmitting authentication requests and authentication information when required. In one variant, the starter authentication connection is replaced by a replacement authentication connection, which will be described later.

In one variant, the starter authentication connection is only used for sending and receiving authentication requests and authentication information only. The starter authentication connection is not used for providing communication services to devices connected to WCD 100. In one variant, the starter authentication connection is allowed for providing communication services to devices connected to WCD 100.

At process 408, the processing unit of WCD 100 determines whether a threshold is reached. When the threshold is reached, the process ends at process 409. The threshold may be evaluated based on one or more conditions including, but not limited to, the number of WCMs being used, the number of R-SIMs being used and/or the total number of WCMs in WCD 100.

In one example, when the threshold is based on the number of WCMs being used, the processing unit of WCD 100 determines whether the number of WCMs being used is equal to the threshold number of WCMs being used. If the number of WCMs being used is equal to the threshold number of WCMs being used, the process ends at process 409. If the number of WCMs being used is smaller than the threshold number of WCMs being used, the processing unit of WCD 100 will go back to process 406 and continue to establish an additional wireless carrier connection using another SIM and another available WCM. The loop from process 406-408 is iterated until the threshold is reached. There is no limitation on how many wireless carrier connections may be established. In one variant, the total number of wireless carrier connections to be established is the total number of WCMs placed in WCD 100.

In another example, when the threshold is based on the number of SIMs being used, the method determines whether the number of SIMs being used is equal to the threshold. If the number of SIMs being used is equal to the threshold number of SIMs being used, the method ends. If the number of SIMs being used is not equal to the threshold number of SIMs being used, then the method moves back to process 406 for selecting another SIM from a plurality of available L-SIMs and R-SIMs and iterates loop 406-408 until the threshold is reached.

In one variant, a predetermined time is set to reach the threshold, when the threshold is not met within the predetermined time, the method stops looping back to process 406 and ends. Setting a predetermined time to reach the threshold is beneficial for saving energy and resources. For example, in some scenarios, it may happen that the threshold may not be met because while looping back to process 406 there may be no SIM available to select. As a result, the loop from process 406 to process 408 may continue running until more SIM(s) are inserted into the SIM bank or the WCD, and waste energy and resources.

Figure 4B:
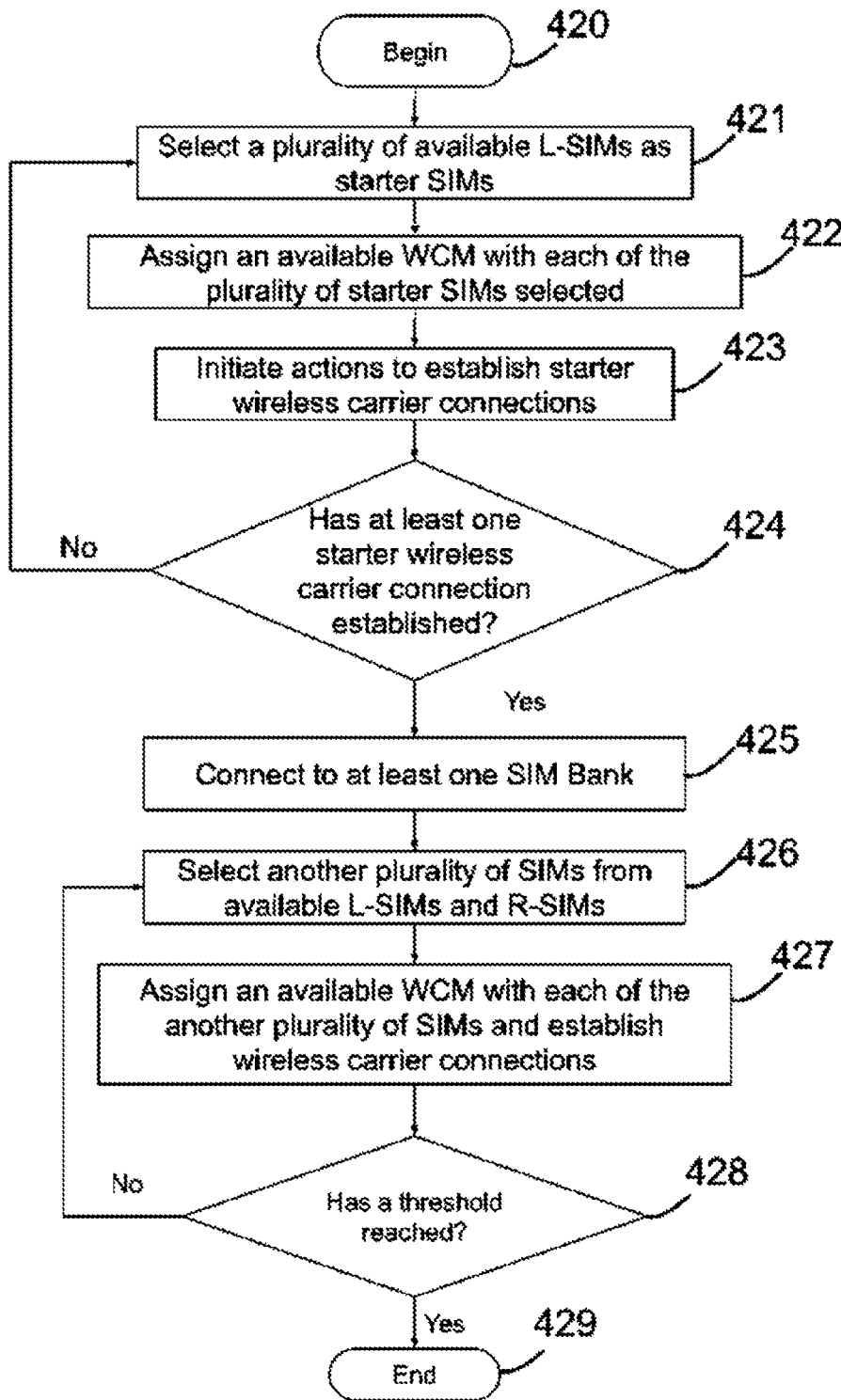
FIG. 4B is a process flowchart illustrating a method according to one example embodiment of the present invention.

FIG. 4B is a process flowchart illustrating a method according to one example embodiment of the present invention. The method may be performed at processing unit 160 of WCD 100. FIG. 4B should be viewed in conjunction with FIG. 1A and FIG. 2A. The method begins at process 420. In process 421, the method selects a plurality of available L-SIMs as starter SIMs. The method illustrated in FIG. 4B is similar to the method illustrated in FIG. 4A. The selection of the first plurality of available L-SIMs to be starter SIMs may be performed in the same manner discussed in process 401 in FIG. 4A, except that, in this example embodiment, multiple SIMs are selected as starter SIMs.

In process 422, each starter SIM of the plurality of starter SIMs is assigned with an available WCM. For example, in FIG. 1A, WCMs 101a-101c are shown, if WCM 101a is already in use, the available WCMs are WCM 101b and 101c.

In process 423, the processing unit of WCD 100 initiates actions to establish starter wireless carrier connections using the plurality of starter SIMs and their corresponding WCMs assigned.

In process 424, the processing unit of WCD 100 determines whether at least one starter wireless carrier connection has been established or not. If at least one starter wireless carrier connection is successfully established, the processing unit of WCD 100 will use the at least one starter wireless carrier connection(s) to connect at least one SIM bank, such as SIM bank 212a, by establishing at least one starter authentication connection(s), in process 425.

If, in process 424, it is determined that no starter wireless carrier connection has been established, the method moves from process 424 back to process 421 and selects another plurality of L-SIMs as starter SIMs from available L-SIMs and iterates processes 421-423 until at least one starter wireless carrier connection is established. The another plurality of L-SIMs should not include L-SIMs which have already been attempted and failed to establish a connection with. In one variant, attempted L-SIMs may be selected again after a certain period of time. In another variant, attempted L-SIMs may be selected again if all the L-SIMs are attempted at least once still no starter wireless carrier connection is established.

In process 425, if a plurality of starter wireless carrier connection is established, the processing unit of WCD 100 may use any one of the starter wireless carrier connections for connecting a SIM bank by establishing a starter authentication connection and the other starter wireless carrier connection(s) may be used for data communication. In one variant, when the use of an L-SIM may incur roaming charges and an authentication connection is already established using a less expensive wireless carrier connection, the wireless carrier connection of the L-SIM will be disconnected to save cost. In another variant, at least two logical data connections are aggregated together to form an aggregated logical connection for connecting to the SIM bank. The aggregated logical connection may be used as an authentication connection. In one variant, if a plurality of starter wireless carrier connections is established, the processing unit of WCD 100 may use a plurality of starter wireless carrier connections for connecting to a plurality of SIM banks by establishing a plurality of starter authentication connections.

In the case that after all L-SIMs are tried and no starter wireless carrier connection is established, WCD 100 sends a message to its administrator informing that establishing a starter wireless carrier connection has failed and stops the process. In one variant, the message may be displayed on the user interface (UI) of the WCD. In one variant, WCD 100 stops the method without sending the message.

In another variant, a predetermined waiting time is set for establishing at least one starter wireless carrier connection. If no starter wireless carrier connection is established after the predetermined waiting time, WCD 100 sends a message to its administrator informing that establishing a starter wireless carrier connection has failed and stops the method. The message may be displayed on a user interface (UI) of the WCD. In another variant, the method is restarted after a predetermined time interval. The time interval may be set as a default time interval by the manufacturer or maybe manually set by the administrator of WCD 100.

In process 426, the processing unit of WCD 100 selects another plurality of SIMs from available L-SIMs and R-SIMs as SIMs. However, it is preferable that when R-SIMs are selected in process 426, the R-SIMs are selected only from available R-SIMs which are provided by local wireless carrier networks in order to avoid roaming charges. The selection of the SIMs at process 426 may be performed in the same manner discussed in process 406 of FIG. 4A, however in this example embodiment, a plurality of SIMs is selected. In another variant, R-SIMs have higher priority than L-SIMs to be selected at process 426.

In process 427, the processing unit of WCD 100 assigns a corresponding available WCM with each of the plurality of SIMs selected at process 426 and establishes wireless carrier connections using the plurality of SIMs selected at process 426 and the corresponding WCMs. In the course of establishing the wireless carrier connections, authentication requests and authentication information regarding the L-SIMs and R-SIMs are communicated according to the same process as described earlier in process 407 of FIG. 4A.

In process 428, the processing unit of WCD 100 determines whether a threshold is reached. When the threshold is reached, the method proceeds to process 429 and ends. The threshold may be evaluated in the same process as discussed in process 408 of FIG. 4A. When the threshold is not reached, the method loops back to process 426 and selects another plurality of SIMs from available L-SIMs and R-SIMs then iterates processes 427-428. Processes 426-428 are iterated until the threshold is reached.

In one variant, WCD 100 may connect to a plurality of SIM banks at process 425. WCD 100 may connect to each SIM bank of the plurality of SIM banks by establishing one or more logical data connection(s) through one or more wireless carrier connection(s). When WCD 100 connects to a SIM bank through a plurality of logical data connections, the plurality of logical data connections may be carried by a plurality of wireless carrier connections. Therefore, WCD 100 may establish a plurality of aggregated logical data connections for connecting to the plurality of SIM banks.

In one variant, a SIM bank management server is used to manage the plurality of SIM banks. For example, a SIM bank management server 216 shown in FIG. 2A. WCD 100 may communicate with SIM bank management server 216 first for accessing the SIM banks. Before communicating with SIM bank management server 216, WCD 100 may not have the access information of one or more SIM banks 212. After having the access information of SIM banks 212, WCD 100 is then able to communicate with SIM banks 212.

The embodiments described in FIG. 4A and 4B are applicable for establishing a plurality of wireless carrier connections in any geographical area where the WCD is being used regardless of whether the WCD is being used in its home geographical area in a visited geographical area (i.e. foreign geographical area). The home geographical area is the geographical area where the user/subscriber has their wireless carrier account. The visited or foreign geographical area is the geographical area where the user's or subscriber's WCD is not otherwise considered local. For illustration purposes only, application of the embodiment described in FIG. 4A, in home location and in a visited location, is demonstrated in the following paragraphs.

In one example scenario, WCD 100 is being used in its home geographical area. There may be a plurality of wireless carrier networks available in its home geographical area. For example, wireless carrier networks 201*a*-201*c* are available in the home geographical area. WCD 100 may access the wireless carrier networks using SIMs from the respective wireless carrier networks. The SIMs may be placed in WCD 100 or in one or more remote SIM banks. For illustration purposes, L-SIMs 111 and 112 are placed in WCD 100, and R-SIMs 113 are placed in one or more SIM banks 212, for example in SIM bank 212*a*. Also, for illustration purpose, an eSIM, such as eSIM 111*a* from eUICC 116*a* and eSIM 111*b* from eUICC 116*b,* are from wireless carrier network 201*a* and 201*b* respectively, and L-SIMs 112*a* and 112*b* are from wireless carrier network 201*c*. R-SIMs 113*a* and 113*b* are from wireless carrier network 201*a* and wireless carrier network 201*b* respectively. In one variant, R-SIM 113*a* may be placed in SIM bank 212*a* and R-SIM 113*b* may be placed in SIM bank 212*b*. Alternatively, both of the R-SIMs 113*a* and 113*b* may be placed in SIM bank 212*b*. There is no limitation on the number of SIMs that can be placed in a SIM bank.

Continuing with this exemplary scenario, eSIM 111*a* is selected as the starter SIM for establishing a starter wireless carrier connection using a WCM, for example, WCM 101*a*. As a result, a starter wireless carrier connection is established through wireless carrier network 201*a*. WCD 100 then connects SIM bank 212*a* through the starter wireless carrier connection by establishing a starter authentication connection through the starter wireless carrier connection. The starter wireless carrier connection may be reserved for carrying authentication requests and authentication information or may also be used for data communication by establishing more logical data connections. After establishing the starter authentication connection, another SIM is selected from available L-SIMs and R-SIMs for establishing another wireless carrier connection. The selection of the another SIM may be performed manually by an administrator of WCD 100 or maybe be based on a SIM selection policy For example, R-SIM 113*b* is selected from SIM bank 212*a* and WCM 101*b* is assigned with R-SIM 113*b*. Then another wireless carrier connection is established using R-SIM 113*b* and WCM 101*b* through wireless carrier network 201*b*.

Continuing with this exemplary scenario, when establishing the wireless carrier connection using R-SIM 113*b,* wireless carrier network 201*b* may send a request for authentication information to WCM 101*b* regarding R-SIM 113*b*. The authentication request is then forwarded by WCD 100 to SIM bank 212*a* through the starter authentication connection. SIM bank 212*a* replies to the authentication request by providing authentication information regarding R-SIM 113*b* and sends the authentication information to WCD 100. WCD 100 forwards the reply sent by SIM bank 212*a* to the authentication request to wireless carrier network 201*b*. Based on the authentication information provided in the reply, wireless carrier network 201*b* may then accept or refuse R-SIM 113*b* for establishing the wireless carrier connection.

If accepted, the wireless carrier connection using R-SIM 113*b* will be established. If refused, the establishment of the wireless carrier connection using R-SIM 113*b* fails and WCD 100 may select another R-SIM, for example, R-SIM 113*a* and attempts to establish a wireless carrier connection over wireless carrier network 201*a* following the same process.

For illustration purposes, the wireless carrier connection using R-SIM 113*b* has been successfully established. After that, the starter wireless carrier connection may optionally be disconnected and a replacement authentication connection is established through the wireless carrier connection established using R-SIM 113*b*. When the starter wireless carrier connection is disconnected, WCM 101*a* may be unassigned from eSIM 111*a* and become available to be assigned with another SIM to establish another wireless carrier connection. In the case that the another SIM is an R-SIM, the replacement authentication connection may be used for carrying authentication information and authentication requests. In the case that the another SIM, is an L-SIM, there is no need for an authentication connection, as local SIMs are placed in the WCD and the authentication information regarding local SIMs can be accessed directly.

After successful establishment of the wireless carrier connection using R-SIM 113*b,* the processing unit of WCD 100 determines whether a threshold is reached. When a threshold is reached the process ends and the wireless carrier connections are used for data communications which is described later. On the other hand, if the threshold is not reached, the processing unit of WCD 100 keeps establishing another wireless carrier connection using another L-SIM or R-SIM until the threshold is reached.

In another exemplary scenario, WCD 100 is being used in a visited geographical area. Wireless carrier networks 201*a*-201*c* may not be available in the visited geographical area. For example, wireless carrier networks P, Q, R, S are available in the visited geographical area. However, WCD 100 may still place SIMs from wireless carrier networks 201*a*-201*c* and does not have any SIMs from wireless carrier networks P, Q, R and S.

For example, eSIMs 111*a* and 111*b* are from wireless carrier network 201*a* and wireless carrier network 201*b* respectively, and L-SIMs 112*a* and 112*b* are from wireless carrier network 201*c*. R-SIM 113*a* is from wireless carrier network 201*a* and R-SIM 113*b* is from wireless carrier network P. Different from the previous exemplary scenario where both of R-SIMs 113 were from wireless carrier networks of home geographical area, in this exemplary scenario, R-SIM 113*a* is from a wireless carrier network of home geographical area and R-SIM 113*b* is from wireless carrier network of the visited geographical area. Each of the SIM banks 212 may place SIMs from different wireless carrier networks of different geographical areas. For illustration purposes, R-SIMs 113*a* and 113*b* are placed in SIM bank 212*a*. In one variant, the SIM banks may be managed through a SIM bank management server.

For example, eSIM 111*a* is selected as the starter SIM and WCM 101*a* is assigned with it. As eSIM 111*a* is from wireless carrier network 201*a* and WCD 100 is in a visited geographical area, eSIM 111*a* is now a foreign SIM as it's not from a local wireless carrier network of the visited geographical area. WCD 100 then initiates establishing a starter wireless carrier connection using eSIM 111*a* and WCM 101*a*. For establishing the starter wireless carrier connection, WCD 100 first generates a request for data connection using authentication information of eSIM 111*a*. The request for data connection may be received by one or more local wireless carrier networks of the visited geographical area. For example, wireless carrier network Q has received the request for data connection. In one variant, the request for data connection may be mechanically generated by WCD 100 when it opens or enters in the visited geographical area.

If wireless carrier networks 201a and Q have a roaming agreement, then wireless carrier network Q may check the validity of the authentication information provided by communicating with wireless carrier network 201a and decide on whether to provide Internet access to WCD 100 based on the authentication information. If the authentication information is valid, then the starter wireless carrier connection will be established.

If the authentication information is not valid, wireless carrier network Q may not provide Internet access to WCD 100 and the establishment of the starter wireless carrier connection may be failed. WCD 100 may again try to establish wireless carrier connection following the same process using another L-SIM from a different wireless carrier network, for example, using L-SIM 112a from wireless carrier network 201c. For illustration purposes, the starter wireless carrier connection using eSIM 111a is successfully established.

Since the starter wireless carrier connection is established using eSIM 111a and eSIM 111a is from wireless carrier network 201a which is a non-local wireless carrier network of the visited geographical area, as a result, data communication using the starter wireless carrier connection will involve roaming charges.

Therefore, after successful establishment of the starter wireless carrier connection, WCD 100 connects with a remote SIM bank, for example, SIM bank 212a, by establishing a starter authentication connection through the starter wireless carrier connection. An R-SIM is then selected from SIM bank 212a. It should be noted that, in this exemplary scenario, after establishing the starter authentication connection, the subsequent SIMs (SIMs that are selected after the establishment of the starter wireless carrier connection) are selected only from available R-SIMs based on the SIM selection policy unlike to the previous exemplary scenario where the subsequent SIMs were selected from available L-SIMs and R-SIMs. This is due to avoid roaming charges, as in this exemplary scenario, WCD 100 is being used in a visited geographical area, therefore, using of L-SIMs may involve roaming charges since the L-SIMs are from the wireless carrier networks of home geographical area. The selection of R-SIM may be performed by a processing unit of WCD 100, SIM bank 212a or SIM bank management server 216. When the selection is performed by the processing unit of SIM bank 212a or SIM bank management server 216, after selecting an R-SIM, the selection information is sent to WCD 100. The processing unit of WCD 100 then assigns the selected R-SIM with an available WCM. For example, R-SIM 113b is selected and is assigned with WCM 101b.

The SIM selection policy may be based on one or more of the following criteria: position of an R-SIM placed in a SIM bank, R-SIM category, tariff price of an R-SIM, network's performance history of a SIM, services offered by the wireless carrier network of an R-SIM, service quality of the wireless carrier network of an R-SIM, administrator's preference, geolocation of WCD 100, billing cycle information and time. For example, when an R-SIM is selected based on the geolocation of WCD 100, the R-SIM should be selected from a local wireless carrier network corresponding to the current location of or wireless carrier networks available at WCD 100. In this case, R-SIM 113b is selected as it is from wireless carrier network P which is a local wireless carrier network of the visited geographical area.

For illustration purposes, R-SIM 113b is from wireless carrier network P. When establishing the wireless carrier connection using R-SIM 113b, wireless carrier network P may send a request to WCM 101b for authentication information regarding R-SIM 113b. The authentication request is then forwarded by WCD 100 to SIM bank 212a through the starter authentication connection. SIM bank 212a replies to the authentication request by providing authentication information regarding R-SIM 113b to WCD 100. The authentication information may also include other information depending on the requirements. WCD 100 forwards the authentication information to wireless carrier network P as a reply to the authentication request. Based on the authentication information provided in the reply, wireless carrier network P may accept or refuse the establishment of the wireless carrier connection using R-SIM 113b.

If accepted, the wireless carrier connection over wireless carrier network P is successfully established. If refused, the establishment of the wireless carrier connection using R-SIM 113b fails. After that, another R-SIM may be selected and attempted to establish a wireless carrier connection using it according to the same processes as disclosed above.

For illustration purposes, wireless carrier connection using R-SIM 113b is successfully established. The processing unit of WCD 100 then determines whether a threshold is reached. When a threshold is reached the process ends and wireless carrier connections are used for data communications which is described later. On the other hand, if the threshold is not reached, the processing unit of WCD 100 keeps establishing another wireless carrier connection using another R-SIM until the threshold is reached.

In one variant, after successful establishment of the wireless carrier connection using R-SIM 113b, the starter wireless carrier connection is retained standby and not used or disconnected in order to reduce roaming charges and save resources. In that case, a replacement authentication connection is established through the wireless carrier connection established using R-SIM 113b for transmitting authentication information and authentication requests.

There is no limitation on the number of SIM banks may be utilized. When one SIM bank is used for placing all R-SIMs, the SIM bank may be placed in a centralized location, for example, in the home geographical area of the WCD and may place SIMs from different wireless carrier networks of the home geographical area and foreign geographical area. If multiple SIM banks are used, some of the SIM banks may be placed in the home geographical area and some may be placed in different foreign geographical areas. When SIM banks are placed in different foreign geographical areas, each SIM bank may place SIMs from the local wireless carrier networks of the corresponding geographical area. For example, SIM bank 212a may be placed in the home geographical area of WCD 100 and places SIMs from different local wireless carrier networks of the home geographical area. On the other hand, SIM bank 212b may be placed in a foreign geographical area and has SIMs from different local wireless carrier networks of the foreign geographical area.

In one variant, there is no restriction that an authentication connection must also be used for data communication when not being used to communicate SIM authentication information. For example, the authentication connection may be used for data communication, such as web browsing and file transfer, when the bandwidth provided by non-authentication connection(s) is not adequate or below a threshold. When the bandwidth provided by the non-authentication connection(s) is adequate or above the threshold, the authentication connection will not be used for data communication. In another example, when WCD 100 is being used in a foreign country or may incur roaming charges, the authentication connection will not be used for data communication unless there is no other wireless carrier connection could be established. This may reduce roaming charges.

In one variant, the authentication connection is also used for data connection without any limitation. After the establishment of the second data connection, the first and the second data connection may also be used to carry authentication information for establishing additional wireless carrier connections, such as the third data connection and so on.

In one variant, any wireless carrier connection or a plurality of wireless carrier connections may be used to carry for establishing one or more authentication connections. There is also no limitation on the number of connections to be used as an authentication connection, any one or more established data connections may be used as authentication connection(s).

In one variant, only the first data connection established using the starter SIM is used as an authentication connection. In another variant, WCD 100 is being used in a foreign country the data connection established using the starter SIM is disconnected after successfully establishing the second wireless carrier connection in order to avoid roaming charges and the second data connection is used as authentication connection. In another variant, both the first and the second data connections are used as authentication connections.

Figures 5A, 5B:
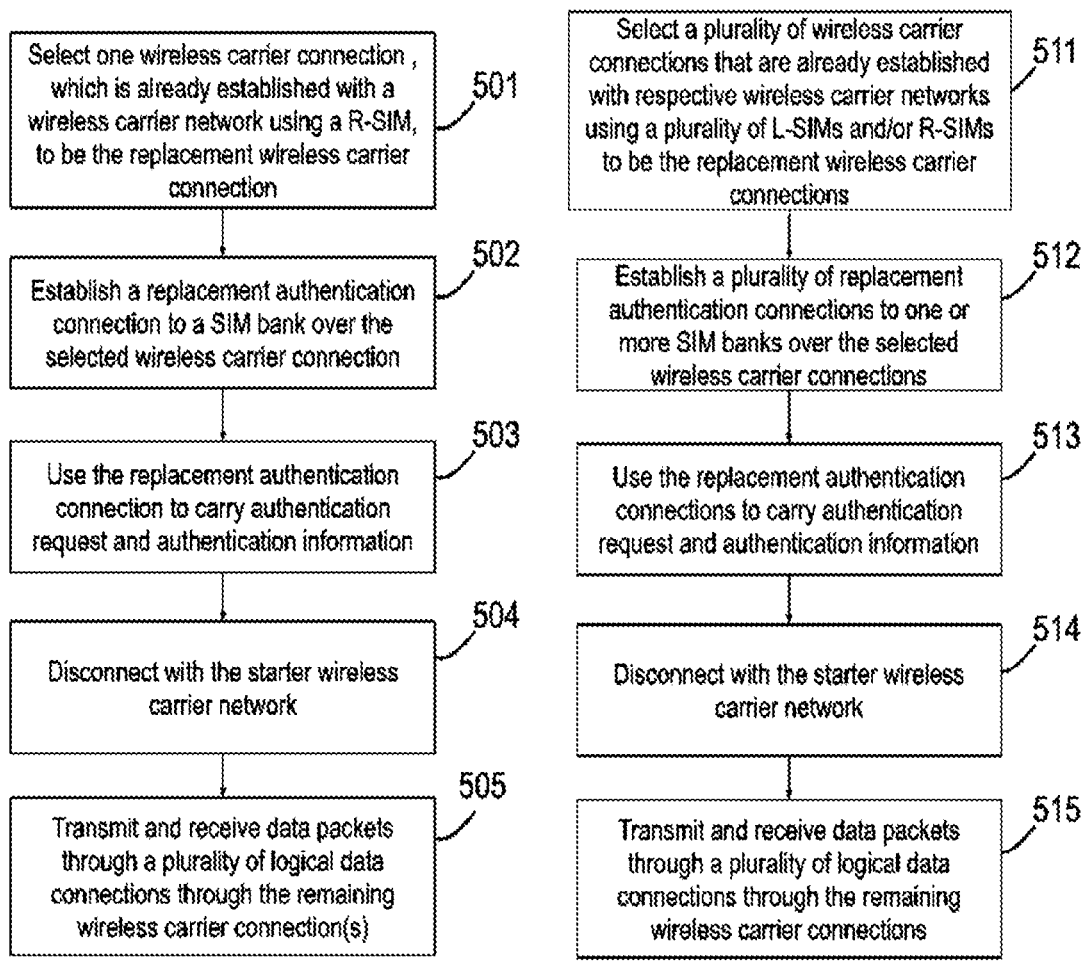
FIG. 5A is a process flowchart illustrating a method according to one example embodiment of the present invention.
FIG. 5B is a process flowchart illustrating a method according to one example embodiment of the present invention.
Figure 5C:
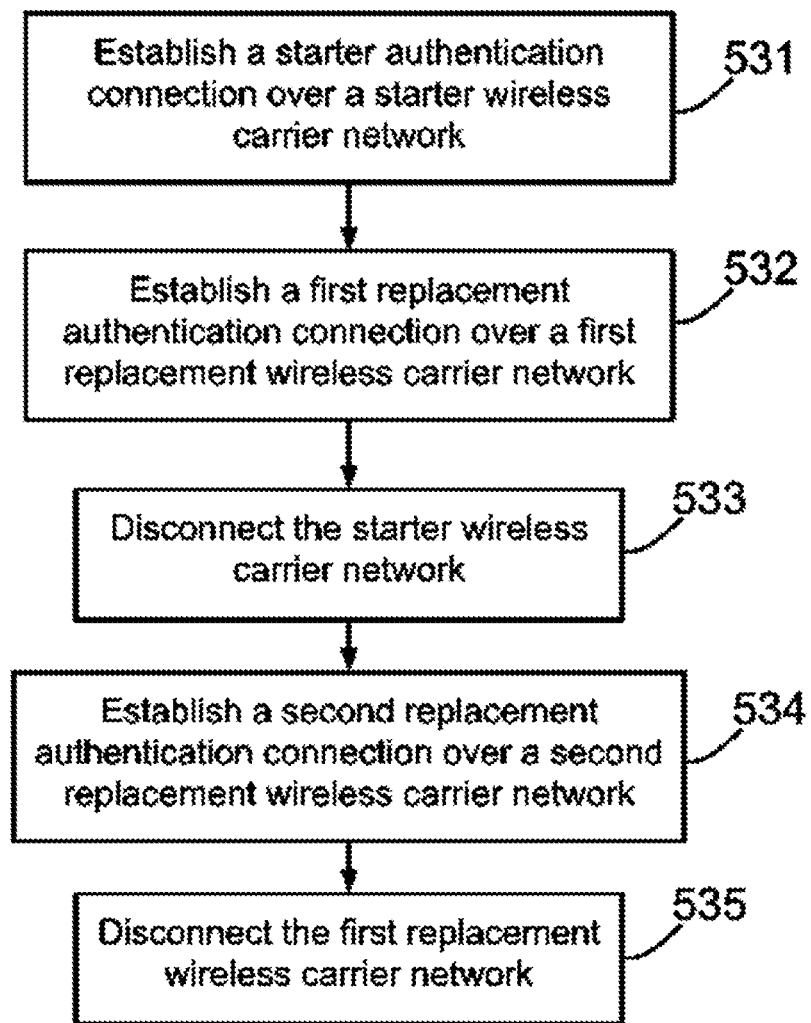
FIG. 5C is a process flowchart illustrating a method according to one example embodiment of the present invention.

The process flowcharts illustrated by FIGS. 5A, 5B and 5C are to allow WCD 100 to use one or more R-SIMs to provide communication service to devices and users over wireless carrier networks but not the starter wireless carrier network. The starter wireless carrier network may not be the most preferred wireless carrier network to use in terms of tariffs, network performance, time and location. Therefore, once the starter wireless carrier connection is established, the processing unit of WCD 100 starts trying to establish other wireless carrier connections to replace starter wireless carrier connection or to reduce the usage of the starter wireless carrier connection. FIG. 5A is a process flowchart illustrating a method according to one example embodiment of the present invention. The method may be performed at processing unit 160 of WCD 100.

FIG. 5A should be viewed in conjunction with FIG. 1A, FIG. 2A and FIG. 4A. FIG. 5A may also be viewed in conjunction with FIG. 1A, FIG. 2A and FIG. 4B. After process 408 or process 427, there should be at least two wireless carrier connections established with at least two wireless carrier networks.

For clarity, the authentication connection over a wireless carrier network using the starter SIM is referred to as the starter authentication connection, and the wireless carrier network is referred to as the starter wireless carrier network. For example, the processing unit has used a starter SIM to establish a wireless carrier connection with wireless carrier network 201*c*. Then the processing unit of WCD 100 may connect to SIM bank 212*a* through a logical data connection over wireless carrier network 201*c* to carry authentication requests and authentication information. Therefore, wireless carrier network 201*c* is the starter wireless carrier network; the wireless carrier connection established with wireless carrier network 201*c* is the starter wireless carrier connection; and the logical data connection is referred to as the starter authentication connection.

FIG. 5A is a process flowchart illustrating a method according to one example embodiment of the present invention. The processes in FIG. 5A illustrates how the starter authentication connection is replaced by a replacement authentication connection. Under different circumstances, there may be one or more motivations not to continue to use the starter authentication connection over the starter wireless carrier network. The motivations may include: the network performance of the starter wireless carrier network is not adequate; the cost of using the starter wireless carrier network is expensive; the availability of the starter wireless carrier network is not stable. By using a replacement authentication connection over a replacement wireless carrier connection, which is established using an R-SIM with a wireless carrier network, may enjoy better network performance, lower tariffs and/or more stable network availability.

At process 501, the processing unit of WCD 100 selects one wireless carrier network that is already connected to using an R-SIM to be the replacement wireless carrier network. For illustration purposes, WCD 100 has already established one wireless carrier connection with wireless carrier network 201*a* using an R-SIM from SIM bank 212*a*, and selects wireless carrier network 201*a* to be the replacement wireless carrier network. The wireless carrier connection established with the replacement wireless carrier network becomes the replacement wireless carrier connection. For illustration purposes, SIM bank 212*a* is the SIM bank that the starter authentication connected to.

At process 502, the processing unit of WCD 100 then establishes a logical data connection, over the replacement wireless carrier connection, with SIM bank 212*a*. The logical data connection then becomes the replacement authentication connection.

At process 503, the processing unit of WCD 100 then starts using the replacement authentication connection to carry SIM authentication requests and SIM authentication information that is originally carried through the starter authentication connection.

At process 504, the processing unit of WCD 100 disconnects the starter wireless carrier connection established over wireless carrier network 201*c*. It is preferred that the processing unit of WCD 100 disconnects the starter authentication connection gracefully before disconnecting the starter wireless carrier connection. When the starter wireless carrier connection is disconnected, the starter authentication connection will also be terminated. Once the starter wireless carrier connection is disconnected, there will be no more connection with the wireless carrier network 201*c*. This may be cost-saving if wireless carrier network 201*c* has more expensive tariffs than wireless carrier network 201*a* using the R-SIM.

At process 505, the processing unit of WCD 100 may start to or continue to transmit and receive data packets through a plurality of logical data connections using the remaining wireless carrier connections. The remaining wireless carrier connections are connections already established with wireless carrier networks, excluding the replacement wireless carrier connection. For example, when there is a plurality of wireless carrier connections established before process 501, one wireless carrier connection of the plurality of wireless carrier connections has become the replacement wireless carrier connection and the rest of the plurality of wireless carrier connections are remaining wireless carrier connections. By only using logical data connections over the remaining wireless carrier connections to transmit data packets, not related to authentication, allows the replacement wireless carrier connection to be exclusively to carry the replacement authentication connection. This may improve stability and speed of the replacement authentication connection compared to allowing other logical data connections to be established over the replacement wireless carrier connection.

In one variant, other logical data connections are allowed to be established over the replacement wireless carrier connection. This may increase data throughput between WCD 100 and interconnected networks 217.

In one variant, process 504 is not performed. Therefore, the starter wireless carrier connection will still be available. The starter wireless carrier connection may still be used to carry the starter authentication connection. This may improve the network performance between WCD 100 and SIM bank 212*a*. The starter wireless carrier connection may also be used to carry other logical data connections. This may improve the network performance between WCD 100 and interconnected networks 217.

In one variant, after the starter wireless carrier network is disconnected at process 504, the processing unit of WCD 100 will establish a wireless carrier connection using the WCM that was originally used for the starter wireless carrier network with an R-SIM. Then logical data connections and/or an authentication connection may be established over this newly established wireless carrier connection. As a result, the overall network performance of WCD 100 may improve.

FIG. 5B is a process flowchart illustrating a method according to one example embodiment of the present invention. The method may be performed at processing unit 160 of WCD 100. FIG. 5B should be viewed in conjunction with FIG. 1A, FIG. 2A and FIG. 4A. FIG. 5B may also be viewed in conjunction with FIG. 1A, FIG. 2A and FIG. 4B. After process 408 or process 427, there should be at least two wireless carrier connections established with at least two wireless carrier networks.

The method illustrated in FIG. 5B is similar to the method illustrated in FIG. 5A. In the method illustrated in FIG. 5B, a plurality of wireless carrier connections, which are already established with respective wireless carrier networks using a plurality of L-SIMs and/or R-SIMs, to be the replacement wireless carrier connections. In the method illustrated in FIG. 5A, there is one replacement wireless carrier connection.

At process 511, the processing unit of WCD 100 selects a plurality of wireless carrier networks, which are already connected to using a plurality of L-SIMs and/or R-SIMs, to be the replacement wireless carrier networks. For illustration purpose, WCD 100 has already established a wireless carrier connection with wireless carrier network 201a using an R-SIM from SIM bank 212*a;* a wireless carrier connection with wireless carrier network 201*b* using an R-SIM from SIM bank 212*b;* and a wireless carrier connection with wireless carrier network 201*c* using an L-SIM. Also for illustration purposes, the processing unit of WCD 100 selects wireless carrier networks 201*a* and 201*b* to be the replacement wireless carrier network; wireless carrier network 201*c* is the starter wireless carrier network; the wireless carrier connection established with wireless carrier network 201*c* is the starter wireless carrier connection; and SIM bank 212*a* is the SIM bank that the starter authentication connection connected to. Wireless carrier connections established with the replacement wireless carrier networks, i.e. wireless carrier networks 201*a* and 201*b*, become the replacement wireless carrier connections.

At process 512, the processing unit of WCD 100 then establishes two logical data connections through the replacement wireless carrier connections established over the replacement wireless carrier networks 201*a* and 201*b*, with SIM bank 212*a*. The logical data connections then become the replacement authentication connections.

At process 513, the processing unit of WCD 100 then starts using the two replacement authentication connections to carry SIM authentication requests and SIM authentication information that are originally carried through the starter authentication connection.

At process 514, the processing unit of WCD 100 disconnects the starter wireless carrier connection established using wireless carrier network 201*c*. It is preferred that the processing unit of WCD 100 disconnects the starter authentication connection gracefully before disconnecting the starter wireless carrier connection. When the starter wireless carrier connection is disconnected, the starter authentication connection will also be terminated. Once the starter wireless carrier connection is disconnected, there will be no more connection with wireless carrier network 201*c*.

At process 515, the processing unit of WCD 100 may start to or continue to transmit and receive data packets through a plurality of logical data connections using the remaining wireless carrier connections.

In one variant, the replacement authentication connections are aggregated together to form an aggregated authentication connection. The aggregated authentication connection may be an aggregated tunnel that comprises a plurality of tunnels. Each tunnel of the plurality tunnel is established over a replacement wireless carrier connection. There is no limitation on the number of authentication connections or tunnels that may be established over a replacement wireless carrier connection. For example, one replacement authentication tunnel with SIM bank 212*a* and one replacement authentication tunnel with SIM bank 212*b* may be established over a wireless carrier connection with wireless carrier network 201*b*.

In one variant, process 514 is not performed. Therefore, the starter wireless carrier connection will still be available. The starter wireless carrier connection may also be used to carry other logical data connections. The starter wireless carrier connection may continue to be an authentication connection.

In one variant, after the starter wireless carrier network is disconnected at process 514, the processing unit of WCD 100 will establish a wireless carrier connection using the WCM that was originally used for the starter wireless carrier network with an R-SIM. Then logical data connections and/or an authentication connection may be established over this newly established wireless carrier connection.

FIG. 5C illustrates one example embodiment for managing authentication connections over wireless carrier networks after at least one replacement authentication connection is established, over at least one replacement wireless carrier network. At process 531, the processing unit of WCD 100 establishes a starter authentication connection over a starter wireless carrier network. At process 532, the processing unit of WCD 100 establishes a first replacement authentication connection over a first replacement wireless carrier network. The first replacement wireless carrier network is a wireless carrier network firstly connected and used to connect to the SIM bank, which is the SIM bank that the starter authentication connection connects to.

At process 533, the processing unit of WCD 100 disconnects the starter wireless carrier network and therefore the starter authentication connection is also disconnected. When the starter authentication connection is disconnected, authentication requests and authentication information are carried using the first replacement authentication connection. At process 534, the processing unit of WCD 100 establishes a second replacement authentication connection over a second replacement wireless carrier network. The second replacement wireless carrier network is a wireless carrier network connected and used to connect to the SIM bank after the first replacement wireless carrier network. The second replacement wireless carrier network may be any of the replacement wireless carrier networks except the first replacement wireless carrier network and starter wireless carrier network. The processing unit of WCD 100 uses the second replacement authentication connection to connect to the same SIM bank that the starter authentication connection connects to and the first replacement authentication connection connects to.

At process 535, the processing unit of WCD 100 disconnects the first replacement wireless carrier network and therefore the first replacement authentication connection is also disconnected.

The details of establishing the starter authentication connection and the replacement authentication connections have been already disclosed in earlier embodiments of the present invention. Further, the details of using L-SIM and R-SIMs for establishing wireless carrier connections with wireless carrier networks have also been already disclosed in earlier embodiments of the present invention. For example, the starter wireless carrier network may be connected to using an L-SIM while the first and the second wireless carrier networks may be connected to using R-SIMs. The WCM used for using the L-SIM to connect to the starter wireless carrier network may be reused for the R-SIM to connect to the second replacement wireless carrier network.

There is no limitation that process 534 must be performed after process 533. For example, process 534 may be performed before process 533. Further process 533 may be performed after process 535.

In one variant, when there is a plurality of replacement wireless carrier networks, the processing unit of WCD 100 may establish a plurality of replacement authentication connections at process 534.

In one variant, transmitting and receiving of data by devices, such as IoT 204 and laptop 206, connected directly or through a LAN to WCD 100 may be started after the starter wireless carrier connection is established. This allows the devices to communicate with hosts reachable through interconnected networks 217 as soon as possible. In one variant, transmitting and receiving of data by devices may be limited or not allowed through the starter wireless carrier connection. Transmitting and receiving of data by the devices may be started only after the first replacement authentication connection over the first replacement wireless carrier network is established at process 532, in order to reduce the use of the starter wireless carrier connection. This may reduce tariffs and/or roaming charges imposed by the starter wireless carrier or improving network performance. The use of R-SIMs at the SIM banks may reduce tariffs and/or roaming charges as the R-SIMs selected may not incur roaming charges and may offer better network performance. In one variant, transmitting and receiving of data by devices may be limited or not allowed through the starter wireless carrier connection and/or the first replacement authentication connection. Transmitting and receiving of data by the devices may be started only after the second replacement wireless carrier connection over the second replacement wireless carrier network is established at process 534, in order to reduce the use of the starter wireless carrier connection and/or the first replacement wireless carrier connection. In addition to the possibility of reducing tariffs and/or roaming charges imposed by the starter wireless carrier network, performance may be improved and more flexibility on selecting wireless carrier networks may be achieved.

Figure 6:
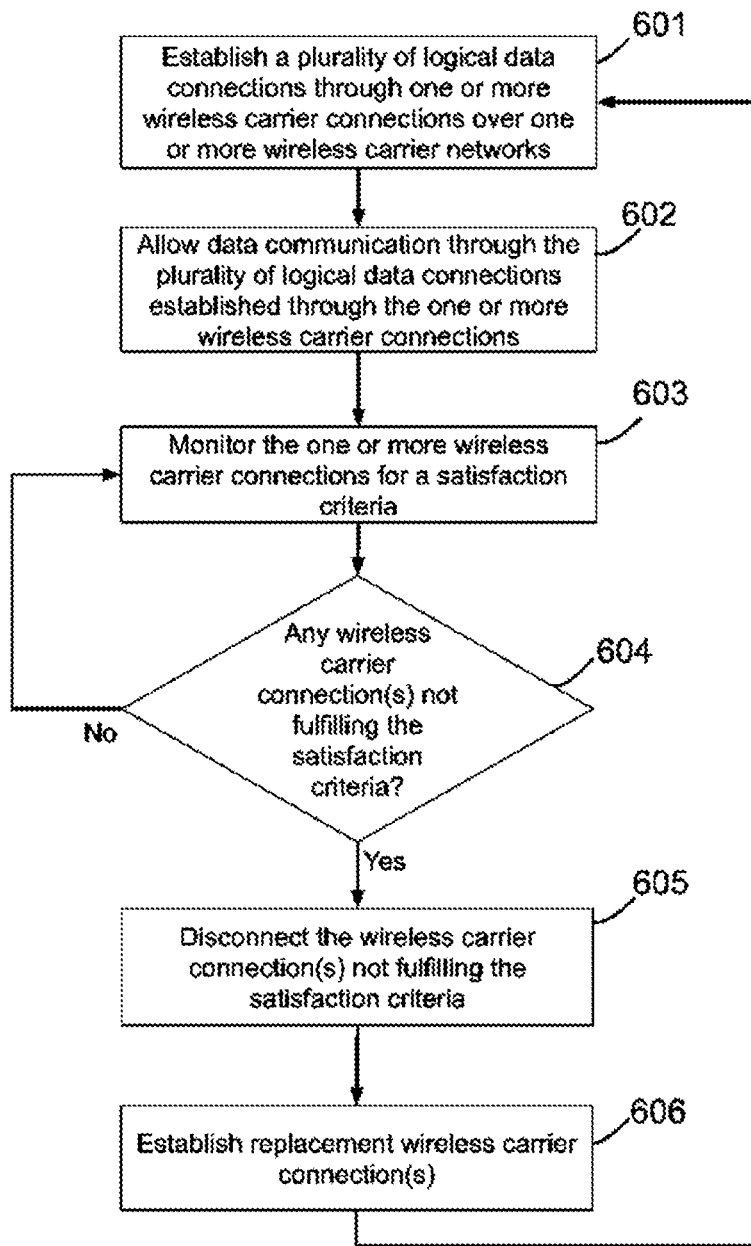
FIG. 6 is a process flowchart illustrating a method according to one embodiment of the present invention.

FIG. 6 is a process flowchart illustrating a method according to one embodiment of the present invention. The processing unit of WCD 100 is used to determine when to disconnect a logical data connection and establish a new logical data connection. FIG. 6 should be viewed in conjunction with FIG. 1A and FIG. 2A. In process 601, The processing unit of WCD 100 establishes a plurality of logical data connections through one or more wireless carrier connections. The one or more wireless carrier connections may be established over one or more wireless carrier networks according to any of the methods described in FIG. 4A and 4B. In one variant, one or more of the logical data connections may also be established through one or more wired network connections established through one or more wide area network (WAN) interfaces of WCD 100.

In process 602, the processing unit of WCD 100 allows data communications through the plurality of logical data connections established through the one or more wireless carrier connections. For illustration purposes, data communications may be performed between a host connected directly or through a local area network to WCD 100 and another host reachable via interconnected networks 217. For example, a host connected to WCD 100 may be laptop 206 or IoT device 204 and another host reachable via interconnected network 217 may be web server 208, SIM banks 212, SIM bank management server 216, eSIM server 214, or a host connected to the network node 210. In one variant, the plurality of logical data connections may be aggregated to form an aggregated tunnel.

In process 603, the processing unit of WCD 100 monitors the one or more wireless carrier connections for satisfaction criteria. The satisfaction criteria may include, but not limited to, connection type, tariff cost, latency, bandwidth and network congestion. In process 604, the processing unit of WCD 100 determines whether there is any wireless carrier connection(s) not satisfying the satisfaction criteria. When the determination result is "No", indicating the satisfaction criteria are met, "No" branch is followed and processes 603-604 are iterated. In one variant, the processing unit of WCD 100 waits for a predetermined time before each iteration of loop 603-604, as this would help to reduce the processing workload of the processor and save energy and resources. If in process 604, the result is "Yes", indicating satisfaction criteria are not met, "Yes" branch is followed and process 605 is performed.

In process 605, the processing unit of WCD 100 disconnects the wireless carrier connection(s) not fulfilling the satisfaction criteria. However, in some example scenarios, it is possible that all wireless carrier connections are failing to fulfill the satisfaction criteria, in such cases, one wireless carrier connection is retained operational while the rest of the wireless carrier connections are disconnected. It is preferable that comparatively the best performing wireless carrier connection is retained operative.

In one variant, each item of the satisfaction criteria may be assigned with a priority level that is configured by an administrator or a user of WCD 100. For example, when tariff cost is given top priority, the connection(s) with high tariff cost should be disconnected first. If all the wireless carrier connections fail to fulfill at least one criterion of the satisfaction criteria, the wireless carrier connection having the least priority level should be retained operative.

In process 606, the processing unit of WCD 100 establishes a replacement wireless carrier connection each of the disconnected wireless carrier connections. After establishing the replacement wireless carrier connection(s), the processing unit of WCD 100 establishes another logical data connection of the plurality of logical data connections through the replacement wireless carrier connection(s) at process 601. The another plurality of logical data connections then may be used for data communication in process 602. In one variant, a replacement wireless carrier connection is established for each of the wireless carrier connections not satisfying the satisfaction criteria even though it is not disconnected. Processes 605 and 606 may be performed interchangeably. As such, replacement wireless carrier connection(s) may be established at process 606 before disconnecting the wireless carrier connections at process 605.

Figure 7:
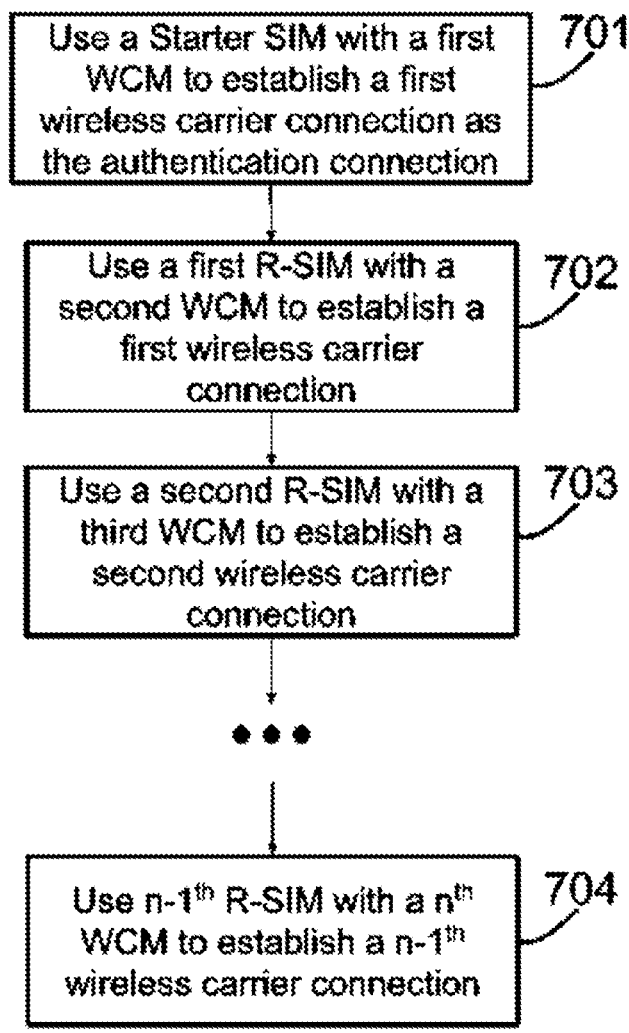
FIG. 7 is a process flowchart illustrating a method according to one embodiment of the present invention.

FIG. 7 is a progress flowchart illustrating one embodiment of the present invention. At process 701, a starter SIM is used with one of WCMs of WCD 100 and the WCM is referred to as the first WCM as it is the first WCM used sequentially. The starter SIM may be an L-SIM, R-SIM or a roaming R-SIM. It is known that a roaming SIM is a SIM card that is capable of operation on more than one network. A roaming R-SIM, as referred in this present invention, is an R-SIM placed in a SIM bank and is capable of operating on more than one wireless carrier network. If there is no logical data connection able to be established with a SIM bank or SIM bank management server, the starter SIM should be an L-SIM as WCD 100 could not be able to use an R-SIM. A starter authentication connection is established with a SIM bank using the starter SIM with the first WCM. In process 702, as an authentication connection is now established, an R-SIM from a SIM bank could be used to establish a wireless carrier connection using a second WCM. As the R-SIM is the first in sequence, the R-SIM is referred to as the first R-SIM and the wireless carrier connection is referred to as the first wireless carrier connection. Authentication requests and authentication information may be transmitted and received through the starter authentication connection.

In process 703, a next R-SIM, referred to as the second R-SIM, will be used to establish a second wireless carrier connection using a next WCM, referred to as the third WCM. Authentication requests and authentication information may be transmitted and received through the starter authentication connection and/or through a replacement authentication connection established through the first wireless carrier connection.

In process 704, a (n−1) th R-SIM, will be used to establish a n th wireless carrier connection using a (n−1) th WCM. Authentication requests and authentication information may be transmitted and received through one or a combination of the authentication connections established through the wireless carrier connections. The processes may continue unless n reaches a threshold or n reaches the number of WCMs in WCD 100. As there are usually numerous R-SIMs in a SIM bank and WCD 100 may connect to a plurality of SIM banks, the number of R-SIMs available should be more than WCMs available. The purpose of these processes is to use as many WCMs as possible.

The authentication connection is not used for transmitting and receiving data for network devices connected to WCD 100, such as local area network 202, IoT 204 and laptop 206. Data to and from network devices connected to WCD 100 is allowed to be transmitted and received through one or a combination of the (n−1) th data connections.

In one variant, the first m th wireless carrier connections are not used for transmitting and receiving data for network devices connected to WCD 100. Data to and from network devices connected to WCD 100 is allowed to be transmitted and received through one or a combination of the (m+1) th to (n−1) th data connections. For illustration purposes, m is five and n is ten, then data to and from network devices connected to WCD 100 is allowed to be transmitted and received through one or a combination of the sixth, seventh, eighth and ninth data connections, but not the first to the fourth wireless carrier connections.

Figures 8A, 8B:
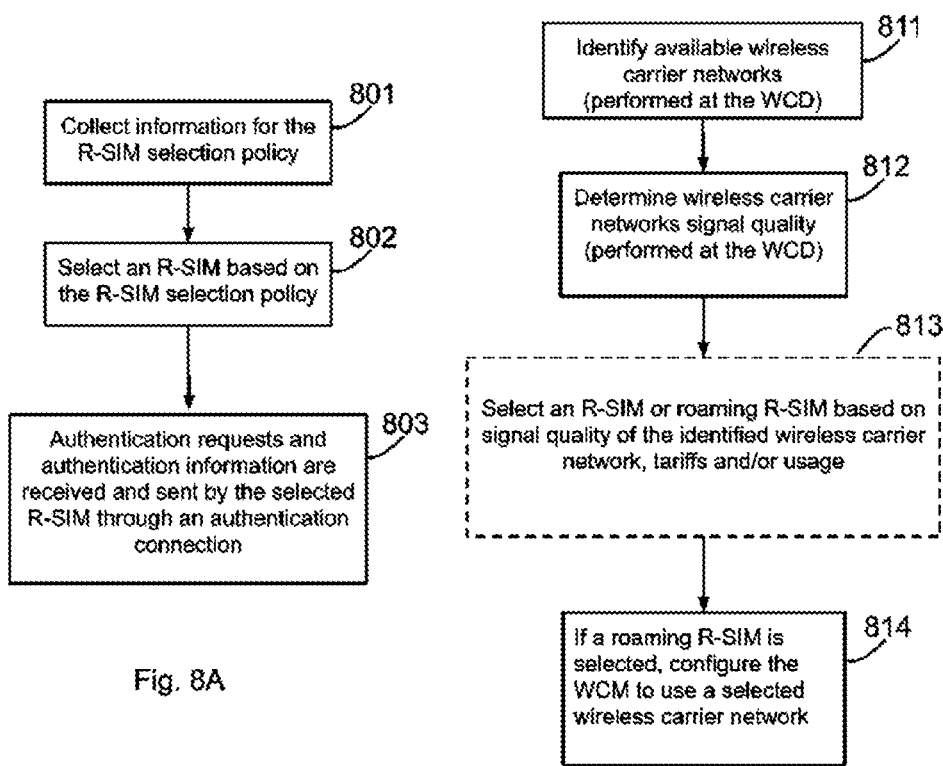
FIG. 8A is a process flowchart illustrating a method according to one example embodiment of the present invention.
FIG. 8B is a process flowchart illustrating a method according to one example embodiment of the present invention.

FIG. 8A is a process flowchart that illustrates an R-SIM selection and authentication process of one exemplary embodiment. When an R-SIM is to be selected by a SIM bank or processing unit of WCD 100, a SIM selection policy may be used to select an R-SIM. Information may be required for the SIM selection policy. At process 801, the information for the SIM selection policy is collected by the processing unit of WCD 100.

At process 802, an R-SIM is selected according to the R-SIM selection process, as illustrated in FIG. 3B, based on the information collected. When the R-SIM selection process is performed by SIM bank, the information collected will be transmitted to the SIM bank through a logical connection, a plurality of logical connection or an aggregated logical connection. The logical connection, the plurality of logical connections or the aggregated logical connection may or may not be a starter. For example, the logical data connection connecting to the SIM bank may be a starter authentication connection or a replacement authentication connection. Information of the selected R-SIM will then be sent to WCD 100.

When the R-SIM selection process is performed by the processing unit of WCD 100, information of a plurality of R-SIMs in at least one SIM bank will be sent to WCD 100. Then the processing unit of WCD 100 will select an R-SIM according to the SIM selection policy with the information collected.

Once an R-SIM is selected, authentication requests received from the corresponding wireless carrier network and authentication information from the R-SIM will be transmitted through an authentication connection established between the SIM bank and WCD 100. There is no limitation that the authentication connection must be a starter or a replacement authentication connection.

FIG. 8B is a more detailed process flowchart for further exemplary embodiments of processes 801 and 802. At process 811, the processing unit of WCD 100 identifies available wireless carrier networks by using at least one WCM of a plurality of WCMs. At process 812, the processing unit of WCD 100 determines signal quality of each of the available wireless carrier networks identified by the at least one WCM. The availability of wireless carrier networks and the corresponding signal quality are then used for the SIM selection policy. In one variant, process 812 is not performed and only the availability of wireless carrier networks is used for the SIM selection policy.

At process 813 an R-SIM or a roaming R-SIM is selected based on wireless carrier networks that meet the signal quality requirement and further based on the tariffs and/or allowed usage of wireless carrier networks. If the signal quality of an available wireless carrier network does not meet a signal quality requirement, the available wireless carrier should not be used and R-SIMs and roaming R-SIMs that have to use that available wireless carrier network will not be selected. In one example, when there are two available wireless carrier networks meeting the signal quality requirement, an R-SIM which uses the wireless carrier network with lower tariffs will be selected. For illustration purposes, the two available wireless carrier networks are 201a and 201b. When wireless carrier network 201a has lower tariffs than the tariffs of wireless carrier network 201b, an R-SIM or a roaming R-SIM which uses wireless carrier network 201a will be selected.

In one variant, there are three available wireless carrier networks 201a-201c meet the signal quality requirement and WCD 100 has two available WCMs. For illustration purposes, wireless carrier networks 201a and 201c both have the same tariffs and are less expensive than the wireless carrier network 201b. Therefore, only R-SIMs and roaming R-SIMs using wireless carrier networks 201a and/or 201c will be selected and R-SIMs and roaming R-SIMs using wireless carrier network 201b will not be selected. For roaming R-SIMs that are configurable to use any of the three wireless carrier networks, they may still be selected but will be configured to use wireless carrier networks 201a and/or 201c in process 814.

The R-SIM selection process may be performed by the processing unit of WCD 100, a processing unit of a SIM bank 212 or a processing unit of a SIM bank management server 216. When the R-SIM selection process is performed by the processing unit of WCD 100, information, such as identity of the wireless carrier networks, tariffs and allowed usage of the R-SIMs and roaming R-SIMs, will be sent to the WCD 100 by the processing unit of SIM bank 212 or SIM bank management server 216 for the processing unit to select. Similarly, when the R-SIM selection process is performed by the processing unit of the SIM bank management server, the information will also be sent to SIM bank management server 216. In one example, a SIM bank may select a plurality of R-SIMs and/or roaming R-SIMs first, then the processing unit of WCD 100 may select one or more R-SIMs and/or roaming R-SIMs from the plurality of R-SIMs and/or roaming R-SIMs selected by the SIM bank.

FIG. 8C is a more detailed process flowchart for further exemplary embodiments of processes 801 and 802. At process 821, the processing unit of WCD 100 identifies its geographical location. Geographical location may be determined by using GPS. At process 822, an R-SIM or a roaming R-SIM is selected based on the geographical location information and is further based on the tariffs and/or data usage allowance. A database or a look-up table may be used to search for wireless carrier networks that may be used in the geographical location. The database or the look-up table may be stored in WCD 100, a SIM bank, a plurality of SIM banks and/or a SIM bank management server. For example, longitude and latitude information, based on GPS information obtained from a GPS receiver at WCD 100, may be used to look-up for available wireless carrier networks at the geographical location of WCD 100.

Similar to the processes illustrated in FIG. 8B, there is no limitation that only one R-SIM or roaming R-SIM is selected. For example, a plurality of R-SIMs and/or roaming R-SIMs may be selected.

In one example, based on the GPS location information of WCD 100, a database is searched for available wireless carrier networks. For illustration purposes, the records in the database indicate that there are two available wireless carrier networks at the location of WCD 100. For example, the two available wireless carrier networks are 201a and 201b and wireless carrier network 201a has a lower tariff than the tariffs of wireless carrier network 201b, thus, an R-SIM or a roaming R-SIM using wireless carrier network 201a will be selected.

In one variant, there are three available wireless carrier networks 201a-201c, according to the database records and WCD 100 has two available WCMs. For illustration purposes, wireless carrier networks 201a and 201c both have the same tariffs and are less expensive than the tariffs of wireless carrier network 201b. Therefore, only R-SIMs and roaming R-SIMs using wireless carrier networks 201a and/or 201c will be selected and R-SIMs and roaming R-SIMs using wireless carrier network 201b will not be selected. For roaming R-SIMs that are configurable to use any of the three wireless carrier networks, they may still be selected but will be configured to use wireless carrier networks 201a and/or 201c in process 823.

FIG. 8D illustrates a method for configuring WCMs when a roaming R-SIM is selected in processes 813 and 822. When a roaming R-SIM is selected, mobile country code (MCC) and mobile network node (MNC) of the wireless carrier network selected will be first determined at process 831 and then will be sent from SIM bank 212 to WCD 100 over an authentication connection in process 832. Then WCD 100 will configure an available WCM with the MCC and MNC in process 833 to allow the WCM to use the wireless carrier network selected. The authentication connection may be a starter authentication connection, a replacement authentication connection or an aggregated authentication connection. For example, wireless carrier network 201a is the wireless carrier network selected in the USA, then MCC and MNC of wireless carrier network 201a will be determined in process 831. MCC and MNC will be sent in process 832 and will be used to configure an available WCM in process 833. In one variant, MCC and MNC information is already stored in WCD 100, and the process unit of WCD 100 may be able to determine the MCC and MNC information itself and is not required to retrieve MCC and MNC information from SIM bank 212. Therefore, process 832 is skipped. One of the benefits of using MCC and MNC is to reduce the process of identifying geographical location of WCD 100.

In another detailed example, an access point name (APN) of an R-SIM or a roaming R-SIM may be sent from SIM bank 212 to WCD 100 to allow an available WCM to establish a desired connection with a wireless carrier network. For example, WCD 100 may be able to access a private network using the APN. In one variant, APN information is already stored in WCD 100, and WCD 100 may be able to provide the APN itself and is not required to retrieve APN information from SIM bank 212.

The R-SIM selection process may be performed by the processing unit of WCD 100, a processing unit of a SIM bank 212 or a processing unit of a SIM bank management server 216.

In one variant, the SIM selection policy is aimed to diversify the use of wireless carrier networks that meet the selection criteria. For example, one R-SIM is needed, three R-SIMs from wireless carrier networks 201a-201c meet the selection criteria respectively and WCD 100 has a WCM that has already established a wireless carrier connection using an R-SIM from wireless carrier network 201a. Thus, SIM bank 212 will not select the R-SIMs belonging to wireless carrier network 201a among the three R-SIMs due to diversification. SIM bank 212 will select the R-SIM from either wireless carrier network 201b or 201c.

Figures 9A, 9B:
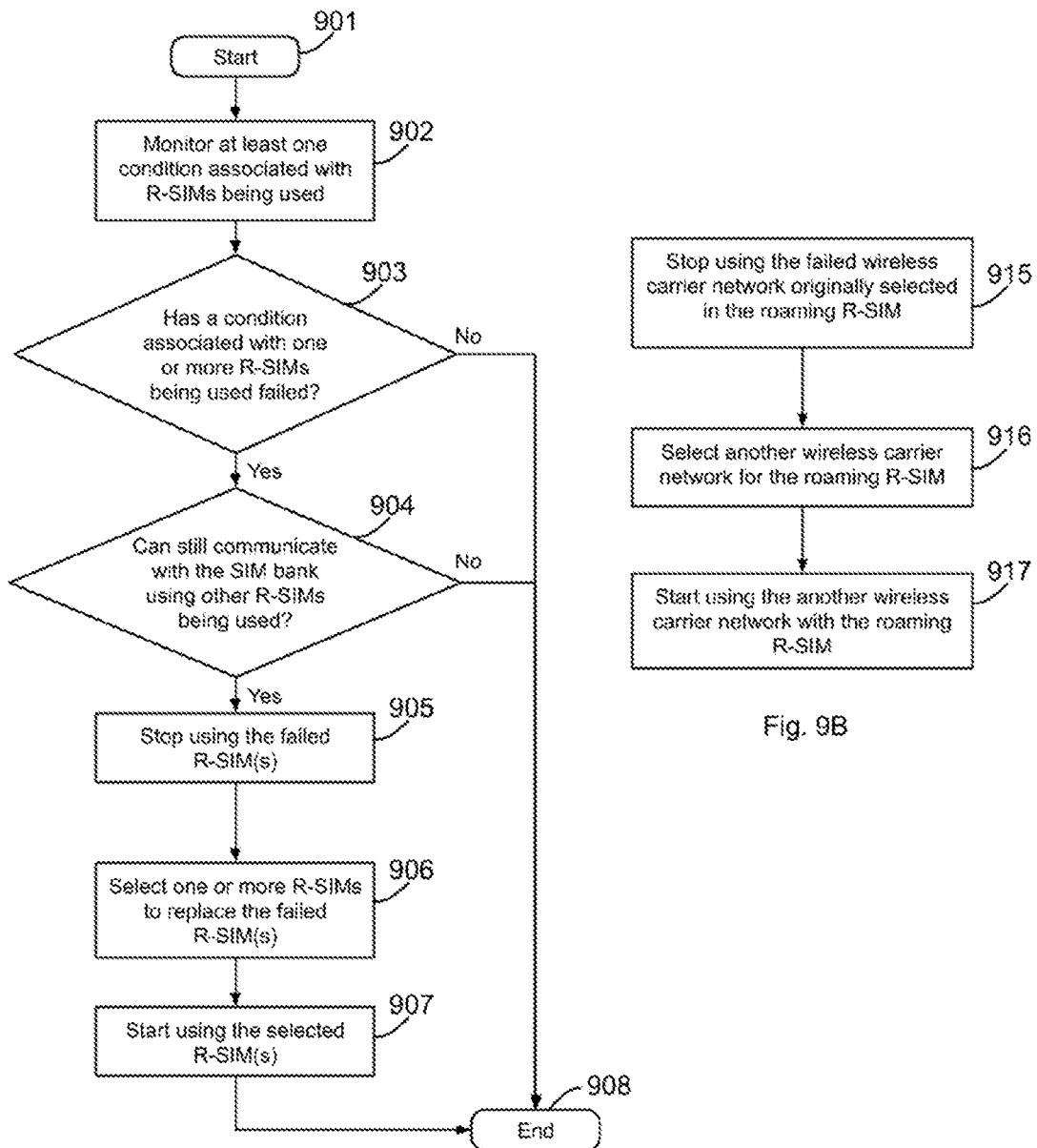
FIG. 9A is a process flowchart illustrating a method according to one example embodiment of the present invention.
FIG. 9B is a process flowchart illustrating a method according to one example embodiment of the present invention.

FIG. 9A is a process flowchart illustrating a method performed at WCD 100 according to one example embodiment of the present invention. Processes 901 to 908 may be performed solely or jointly at WCD 100, at one or more SIM banks 212, and SIM bank management server 216. For illustration purposes, the processing unit of WCD 100 performs processes 901 to 908. The processes start at process 901. For illustration purposes, WCD 100 has three WCMs. Each WCM uses one R-SIM from SIM bank 212a to establish a wireless carrier connection with one of wireless carrier networks 201a-201c. Therefore, WCD 100 has established three wireless carrier connections. WCD 100 communicates with SIM bank 212a using one or more logical data connections established over one or more of the three wireless carrier connections. At process 902, the processing unit of WCD 100 monitors at least one condition associated with R-SIMs being used. For example, the at least one condition is less than 2% packet drop rate of a wireless carrier connection. Therefore, the processing unit monitors the packet drops rate for each of the three wireless carrier connections.

At process 903, determines whether the at least one condition associated with one or more R-SIMs is failed or not. As according to the example, the at least one condition is less than 2% packet drop rate of a wireless carrier connection, thus, the at least one condition fails when the packet drop rate of a wireless carrier connection is more than 2%. For example, packet drop rate of the wireless carrier connection established with wireless carrier network 201b has increased to 3%. Therefore, wireless carrier connection established with wireless carrier network 201b fails the at least one condition. For illustration purposes, (m+2) R-SIM is used to establish the wireless carrier connection with wireless carrier network 201b and therefore becomes a failed R-SIM. A failed R-SIM is an R-SIM used for connecting to the wireless carrier network that failed to satisfy at least one condition.

At process 904, the processing unit of WCD 100 determines if WCD 100 may still communicate with SIM bank 212a over the wireless carrier connections established with wireless carrier networks 201a and/or 201c. If WCD 100 is able to communicate with SIM bank 212a through one or both of the wireless carrier connections established with wireless carrier networks 201a or 201c, the processing unit of WCD 100 will stop using the failed R-SIM at process 905. The processing unit of WCD 100 will select another R-SIM, for example, (m+1) R-SIM to replace the failed R-SIM at step 906 and start using (m+1) R-SIM at step 907.

If determined at process 904 that there are no other wireless carrier connections that could be used to communicate with SIM bank 212a, the processing unit may continue to use the wireless carrier connection established with wireless carrier network 201b and end the processes at process 908.

There is no limitation that all the processes in FIG. 9A must be performed by the processing unit of WCD 100. Some or all of the processes could be performed by the processing unit of SIM bank 212 and/or SIM bank management server 216. In one example, the condition at step 902 may be the amount of data usage allowed per R-SIM is approaching the limit. The process to verify the amount of data usage may be performed by the processing unit of WCD 100, the processing unit of SIM bank 212 and/or SIM bank management server 216.

In another example, the selection of R-SIM at step 906 may be performed by the processing unit of SIM banks 212 and/or SIM bank management server 216.

In one variant, a same wireless carrier network may be used by a plurality of WCMs. For example, WCMs 101a and 101b may both connect to wireless carrier network 201b concurrently through corresponding R-SIMs. When the wireless carrier network is performing at a lower quality, both WCMs 101a and 101b may experience the same lower quality performance and the corresponding R-SIMs may also fail the condition at process 903. Therefore, at process 905, the processing unit of WCD 100 will stop using the R-SIMs corresponding to WCMs 101a and 101b. At processes 906 and 907, two R-SIMs will be selected and used.

In one variant, the failed R-SIM is a roaming R-SIM. When a condition associated with the roaming R-SIM fails, the processing unit of WCD 100 or the processing unit of SIM banks 212 may be able to continue to use the same roaming R-SIM to establish another wireless carrier connection with another wireless carrier network. Therefore, processes 905, 906 and 907 are replaced by processes 915 to 917 shown in FIG. 9B.

For example, the roaming R-SIM is capable of using wireless carrier network 201a or 201b, where 201b was the original wireless carrier network that was being used. When WCD 100 is moved to an area that has no wireless carrier network 201b coverage, the condition of receiving coverage may fail at process 903. Therefore, at process 915, the processing unit of WCD 100 will disconnect the roaming R-SIM from wireless carrier network 201b. At process 916, the processing unit of WCD 100 will select another wireless carrier network for connecting with the roaming R-SIM. At process 917, the processing unit of WCD 100 will start using the roaming R-SIM by establishing another wireless carrier connection using the roaming R-SIM and the selected wireless carrier network. There is no limitation that all the processes in FIG. 9B must be performed by the processing unit of WCD 100. Some or all of the processes could be performed by the processing unit of SIM bank 212 and/or SIM bank management server 216. There is no limitation that processes 915 to 917 are limited to one roaming R-SIM. Processes 915 to 917 may also be applied to plurality of roaming R-SIMs. There is also no limitation that a roaming R-SIM is capable of using only two wireless carrier networks. There may be more than two wireless carrier networks for selection.

In a detailed example, when a roaming R-SIM is selected, mobile country code (MCC) and mobile network node (MNC) of the wireless carrier network selected may be sent from SIM bank 212 to WCD 100 over an authentication connection. Then WCD 100 will configure an available WCM with the MCC and MNC to allow the WCM to use the wireless carrier network selected. The authentication connection may be a starter authentication connection, a replacement authentication connection or an aggregated authentication connection. For example, wireless carrier network 201a is the wireless carrier network selected in the USA, then MCC and MNC of wireless carrier network 201a will be used to configure the available WCM. In one variant, MCC and MNC information is already stored in WCD 100, and WCD 100 may be able to provide the MCC and MNC information itself and is not required to retrieve MCC and MNC information from SIM bank 212.

In another detailed example, an access point name (APN) of an R-SIM or a roaming R-SIM may be sent from SIM bank 212 to WCD 100 to allow an available WCM to establish a desired connection with a wireless carrier network. For example, WCD 100 may be able to access a private network using the APN. In one variant, APN information is already stored in WCD 100, and WCD 100 may be able to provide the APN itself and is not required to retrieve APN information from SIM bank 212.

FIG. 10 illustrates maintenance of SIM bank connections when multiple wireless carrier connections are established according to the embodiments. For illustration purposes, a first wireless carrier connection is established using WCM 1001 and a first SIM over the wireless carrier network of the SIM, wherein the first SIM is a local SIM. At 1021, the processing unit of WCD 100 sends authentication request 1051 through a starter authentication connection established with SIM bank 1010 through the first wireless carrier connection. Wherein authentication request 1051 was initially received at WCD 100 from a wireless carrier network and then forwarded to SIM bank 1010 by the WCD.

At 1022, WCD 100 receives authentication information 1052 through the starter authentication connection in response to authentication request 1051. Wherein authentication information 1052 contains necessary information corresponding to an R-SIM (second SIM) for establishing a second wireless carrier connection. The processing unit of WCD 100 forwards authentication information 1052 to the wireless carrier network from which authentication request 1051 was initially received. The second wireless carrier connection is then successfully established using a WCM from the available WCMs and the second SIM. For example, WCM 1002 is used from available WCMs 1002-1004.

After successful establishment of the second wireless carrier connection, the first wireless carrier connection may be disconnected. Therefore, WCM 1001 becomes available for being used to establish another wireless carrier connection.

At 1023, the processing unit of WCD 100 sends another authentication request, for example authentication request 1053, to SIM bank 1010. Authentication request 1053 may be sent through a replacement authentication connection established through the second wireless carrier connection. Authentication request 1053 was initially received at WCD 100 from a wireless carrier network and then forwarded to SIM bank 1010 by the WCD.

At 1024, WCD 100 receives authentication information 1054 in response to authentication request 1053 through the replacement authentication connection established through the second wireless carrier connection. Wherein authentication information 1054 contains necessary information corresponding to an R-SIM (third SIM) for establishing a third wireless carrier connection. The processing unit of WCD 100 forwards authentication information 1054 to the wireless carrier network from which authentication request 1053 was initially received. The third wireless carrier connection is then successfully established using a WCM from the available WCMs and the third SIM. For example, WCM 1003 is used from available WCMs 1001, 1003 and 1004.

At 1025, the processing unit of WCD 100 sends another authentication request, for example authentication request 1055, to SIM bank 1010. Authentication request 1055 may be sent through the replacement authentication connection established through the second wireless carrier connection or a replacement authentication connection established through the third wireless carrier connection. For illustration purposes, authentication request 1055 is sent through the replacement authentication connection established through the third wireless carrier connection. Authentication request 1055 was initially received at WCD 100 from a wireless carrier network and then forwarded to SIM bank 1010 by the WCD.

At 1026, WCD 100 receives authentication information 1056 in response to authentication request 1055 through the replacement authentication connection established through the third wireless carrier connection. Wherein authentication information 1056 contains necessary information corresponding to an R-SIM (fourth SIM) for establishing a fourth wireless carrier connection. The processing unit of WCD 100 forwards authentication information 1056 to the wireless carrier network from which authentication request 1055 was initially received. The fourth wireless carrier connection is then successfully established using a WCM from the available WCMs and the fourth SIM. For example, WCM 1001 is used from available WCMs 1001 and 1004.

At 1027, the processing unit of WCD 100 sends another authentication request, for example authentication request 1057, to SIM bank 1010. Authentication request 1057 may be sent through the replacement authentication connection established through the second wireless carrier connection, the replacement authentication connection established through the third wireless carrier connection or a replacement authentication connection established through the fourth wireless carrier connection. For illustration purposes, authentication request 1057 is sent through the replacement authentication connection established through the fourth wireless carrier connection.

Authentication request 1057 was initially received at WCD 100 from a wireless carrier network and then forwarded to SIM bank 1010 by the WCD.

At 1028, WCD 100 receives authentication information 1058 in response to authentication request 1057 through the replacement authentication connection established through the fourth wireless carrier connection. Wherein authentication information 1058 contains necessary information corresponding to an R-SIM (fifth SIM) for establishing a fifth wireless carrier connection. The processing unit of WCD 100 forwards authentication information 1058 to the wireless carrier network from which authentication request 1057 was initially received. The fifth wireless carrier connection is then successfully established using an available WCM, for example, WCM 1004 and the fifth SIM.

There is no limitation that the first wireless carrier connection should be disconnected after the second wireless carrier connection is established, it may be disconnected later (e.g. after establishing the third, fourth, fifth or a following wireless carrier connection) or it may not be disconnected at all. In one variant, when the first wireless carrier connection is not disconnected, authentication request and authentication information for the third, fourth, fifth or a following wireless carrier connection may also be carried through the starter authentication connection established through the first wireless carrier connection.

The invention claimed is:

1. A method for communicating at a wireless communication device, comprising:
    (a) establishing a starter wireless carrier connection using a starter subscriber identification module (SIM); wherein the starter SIM is housed at the wireless communication device;
    (b) establishing a starter authentication connection with at least one SIM bank over the starter wireless carrier connection;
    (c) selecting a plurality of remote SIMs from the at least one SIM bank; wherein:
        the plurality of remote SIMs are housed at the at least one SIM bank; and
        the plurality of remote SIMs are selected by a processing unit of the wireless communication device or by a processing unit of the at least one SIM bank;
    (d) establishing a plurality of wireless carrier connections using the plurality of remote SIMs;
    (e) establishing at least one replacement authentication connection over the plurality of wireless carrier connections;
    (f) providing communication service to devices connected to the wireless communication device over the plurality of wireless carrier connections; and (g) stopping use of the starter authentication connection and the starter wireless carrier connection.

2. The method of claim 1, wherein the starter authentication connection is used to carry authentication request and authentication information.

3. The method of claim 1, further comprising:
when a plurality of replacement authentication connections are established at step (e), aggregating the plurality of replacement authentication connections.

4. The method of claim 1, wherein the at least one replacement authentication connection is used to carry authentication request and authentication information after the starter authentication connection is stopped.

5. The method of claim 1, wherein each remote SIM in the plurality of remote SIMs is selected based on a SIM selection policy at step (c).

6. The method of claim 5, wherein the SIM selection policy is based on at least one of: position of a remote SIM in the at least one SIM bank, remote SIM category, tariff, performance history, services offered by operator of a remote SIM, service quality, administrator's preference, geolocation of the wireless communication device, billing cycle information, and time.

7. The method of claim 1, wherein the starter SIM is a roaming SIM.

8. The method of claim 1, wherein the starter SIM is a removable SIM or an electronic SIM (eSIM).

9. The method of claim 8, wherein the wireless communication device comprises at least one embedded Universal Integrated Circuit Card (eUICC) to store profile information of the eSIM.

10. A system of data communication, comprising at least one wireless communication device for:
(a) establishing a starter authentication connection with at least one subscriber identification module (SIM) bank over a starter wireless carrier connection;
(b) performing the data communication through a plurality of logical data connections; wherein:
the plurality of logical data connections are established over one or more wireless carrier connections in a plurality of wireless carrier connections;
the data communication is performed to provide communication service to devices connected to the wireless communication device;
the plurality of wireless carrier connections are established using a plurality of remote SIMs housed at one or more SIM banks;
the plurality of remote SIMs are selected by the at least one wireless communication device or by the one or more SIM banks; and
the one or more SIM banks are remotely connected to the at least one wireless communication device;
(c) transmitting and receiving, through the starter authentication connection, authentication requests and authentication information; wherein:
the authentication requests are received from respective wireless carrier networks of the plurality of remote SIMs; and
the authentication information are received from the one or more SIM banks; and
(d) stopping use of the starter authentication connection and the starter wireless carrier connection.

11. The system of claim 10, further comprising:
establishing at least one replacement authentication connection over the plurality of wireless carrier connections;
wherein:
the at least one replacement authentication connection is used to carry the authentication requests and the authentication information after the starter authentication connection is stopped;
the plurality of remote SIMs are selected based on a SIM selection policy; and
the authentication information are responses to the authentication requests.

12. A wireless communication device, comprising:
at least one processing unit;
a plurality of wireless communication modules;
at least one subscriber identification module (SIM) card interface; and
at least one non-transitory computer readable storage medium storing program instructions executable by the at least one processing unit for:
(a) establishing a starter wireless carrier connection using a starter SIM; wherein the starter SIM is housed at the wireless communication device;
(b) establishing a starter authentication connection with at least one SIM bank over the starter wireless carrier connection;
(c) selecting a plurality of remote SIMs from the at least one SIM bank; wherein:
the plurality of remote SIMs are housed at the at least one SIM bank; and
the plurality of remote SIMs are selected by the at least one processing unit of the wireless communication device or by a processing unit of the at least one SIM bank;
(d) establishing a plurality of wireless carrier connections using the plurality of remote SIMs;
(e) establishing at least one replacement authentication connection over the plurality of wireless carrier connections;
(f) providing communication service to devices connected to the wireless communication device over the plurality of wireless carrier connections; and
(g) stopping use of the starter authentication connection and the starter wireless carrier connection.

13. The wireless communication device of claim 12, wherein the starter authentication connection is used to carry authentication request and authentication information.

14. The wireless communication device of claim 13, wherein the at least one non-transitory computer readable storage medium further storing program instructions executable by the at least one processing unit for:
when a plurality of replacement authentication connections are established at step (e), aggregating the plurality of replacement authentication connections.

15. The wireless communication device of claim 12, wherein the at least one replacement authentication connection is used to carry authentication request and authentication information after the starter authentication connection is stopped.

16. The wireless communication device of claim 12, wherein each remote SIM in the plurality of remote SIMs is selected based on a SIM selection policy at step (c).

17. The wireless communication device of claim 16, wherein the SIM selection policy is based on at least one of: position of a remote SIM in the at least one SIM bank, remote SIM category, tariff, performance history, services offered by operator of a remote SIM, service quality, administrator's preference, geolocation of the wireless communication device, billing cycle information, and time.

18. The wireless communication device of claim 12, wherein the starter SIM is a roaming SIM.

19. The wireless communication device of claim 12, wherein the starter SIM is a removable SIM or an electronic SIM (eSIM).

20. The wireless communication device of claim 19, wherein the wireless communication device comprises at least one embedded Universal Integrated Circuit Card (eUICC) to store profile information of the eSIM.

* * * * *